United States Patent [19]
Mansell et al.

[11] Patent Number: 5,223,844
[45] Date of Patent: Jun. 29, 1993

[54] VEHICLE TRACKING AND SECURITY SYSTEM

[75] Inventors: John P. Mansell; William M. Riley, both of Dallas, Tex.

[73] Assignee: Auto-Trac, Inc., Dallas, Tex.

[21] Appl. No.: 870,141

[22] Filed: Apr. 17, 1992

[51] Int. Cl.[5] .................. H04B 7/185; G01S 5/02
[52] U.S. Cl. .................................... 342/357; 342/457
[58] Field of Search .............................. 342/357, 457

[56] References Cited

U.S. PATENT DOCUMENTS

| | | |
|---|---|---|
| 4,688,026 | 8/1987 | Scribner et al. |
| 4,891,650 | 1/1990 | Sheffer ............................ 342/457 |
| 5,014,206 | 5/1991 | Scribner et al. |
| 5,032,845 | 7/1991 | Velasco ........................... 342/457 |
| 5,043,736 | 8/1991 | Darnell et al. .................. 342/357 |
| 5,103,459 | 4/1992 | Gilhousen et al. ................ 375/1 |

OTHER PUBLICATIONS

International Teletrac Systems, "Have an Unfair Advantage Over Car Thieves", (advertising flyer), 1990, 3 pages.
International Teletrac Systems, "How to Put Your Fleet on the Map", (advertising flyer), undated, 5 pages.
Trimble Navigation, "FleetVision Integrated Fleet Management System", undated, 9 pages.
Trimble Navigation (Sunnyvale, Calif., ), "StarFinder GPS Intelligent Mobile Sensor", 1991, 2 pages.
Trimble Navigation (Sunnyvale, Calif.), "StarView Tracking and Display Station", undated, 2 pages.
Chapman Security Systems, Inc. (Bensenville, Ill.), "Chapman 911CLS" Product Catalogue, undated, 4 pages.
Westinghouse (Baltimore, Md.) "Vehicle Management Systems", product catalogue, undated, 4 pages.
METS, Inc. (Indianapolis, Ind.) "Public Safety Police, Fire and Emergency Medical Services", 1989, 4 pages.
METS, Inc. (Indianapolis, Ind.) "Trucking National & Regional Fleet Control", 1989, 4 pages.

*Primary Examiner*—Theodore M. Blum
*Attorney, Agent, or Firm*—Mason, Fenwick & Lawrence

[57] ABSTRACT

The present invention provides a vehicle tracking and security system which allows immediate response in case of vehicle theft, an accident, vehicle breakdown, or other emergency. Guardian and tracking functions are provided through Mobile Units installed in hidden locations in vehicles to be monitored. The Mobile Units communicate with a Control Center. Preferably, the Mobile Unit provides vehicle theft and intrusion protection using an in-vehicle alarm and security system linked to the Control Center by a transceiver in the Mobile Unit. Also, a keypad or other human interface device is provided, allowing a vehicle driver or occupant to signal the Control Center that a particular type of assistance is needed. The vehicle's location may be automatically transmitted to the Control Center along with any automatic alarm signal or manually entered request, the location being precisely determinable anywhere in the world through use of Global Positioning System (GPS) information. The present invention provides continuous monitoring of a large number of vehicles for a broad range of status and emergency conditions over a virtually unlimited geographic area, also allowing manual communication of requests for assistance to that specific location. Advantageously, the system is implemented using existing commercial or police communications equipment.

11 Claims, 20 Drawing Sheets

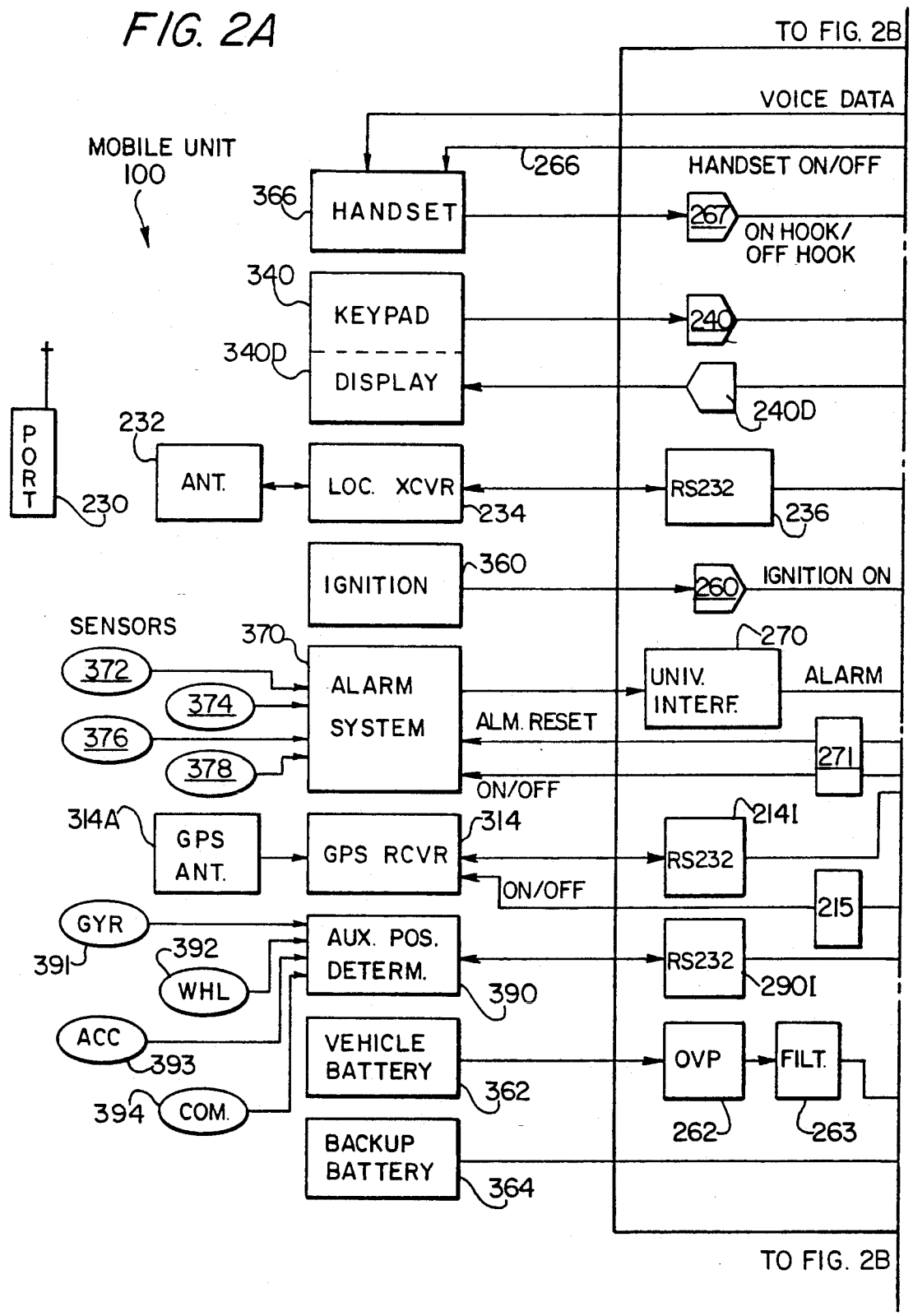

VEHICLE TRACKING AND SECURITY SYSTEM

BACKGROUND OF THE INVENTION

1. Field of the Invention

The present invention relates to systems for monitoring vehicles. More specifically, the invention relates to a multi-featured system for monitoring the status of vehicles, detecting certain alarm conditions, monitoring the location of vehicles, and providing a variety of communication and control functions relating to the vehicles.

2. Related Art

The Federal Bureau of Investigation reports that a vehicle theft occurs somewhere in the United States every 20 seconds. The National Auto Theft Bureau (NATB) estimates that one of every 42 vehicles in the United States is stolen or broken into, or has parts, contents, or accessories stolen, resulting in an estimated loss of over $9 billion per year. Law enforcement officials concede that theft of the vehicle and its contents is one of the easiest crimes to commit, and one of the most difficult to prevent and solve. Authorities estimate that an experienced auto thief can break into almost any vehicle in as little as six seconds, regardless of whether or not it has an alarm system. On average, fewer than one in five of the vehicles stolen in the United States is recovered and the thief prosecuted. Clearly, known alarm systems do not stop determined, experienced motor vehicle thieves.

Various anti-theft devices are known in the art. The simplest devices take the form of physical restraints, such as door locks, steering wheel bars, or wheel locks. More sophisticated systems involve passive alarms that activate automatically when the driver leaves the car.

More recently, electronic homing devices have been developed that can track a vehicle, but only after it is reported stolen. After the vehicle is discovered to be stolen and reported to police, the police are able to track and capture the thief, provided the vehicle owner and the police have both invested in special communications devices. In addition to being useful only after the vehicle is reported stolen, these systems are useful only in the geographical areas where the corresponding police receivers are located. Moreover, these systems are in some cases prohibitively expensive.

Therefore, there is a need in the art to provide a cost-effective automatic vehicle theft detection device which immediately alerts the police to the theft, allowing them to track the vehicle over a wide geographic area.

On a related matter, breakdowns, accidents, and medical and other emergencies in a motor vehicle may arise. Clearly, it is desirable to be able to quickly and conveniently report the emergency occurrence and request appropriate assistance. For example, it is desirable to contact a wrecker, ambulance, fire truck, or police as needed, and indicate the exact location where assistance is needed. The presence of citizens band radios or cellular telephones has increased, but these systems suffer from shortcomings such as the inability to accurately relay the vehicle's position.

Therefore, there is a need in the art to provide a system which can quickly summon appropriate vehicles such as a wrecker, ambulance, fire truck, or police, and reliably and accurately communicate the location where the assistance is needed.

On still another related issue, companies such as courier services and freight hauling firms have always had a need for tracking the vehicles in their fleets. By tracking the fleet vehicles, a dispatcher knows which vehicle is the most appropriate one to send to a next location, thus improving overall fleet efficiency. It is desirable to provide information on the status of each vehicle in the fleet, such as whether it is moving, parked, or disabled. This comprehensive information allows the dispatcher to use an existing fleet to its greatest advantage, thereby providing better service to the company's customers. Unfortunately, known fleet monitoring systems have often involved two-way voice communications depending on the dispatcher's communication with a large number of drivers, resulting in less than optimum efficiency and reliability.

Therefore, there is a need in the art to provide a fleet tracking system which provides a dispatcher with continuously updated comprehensive information about the variety of vehicles in a fleet.

The present invention provides a vehicle tracking and security system which overcomes the shortcomings of the known systems.

SUMMARY OF THE INVENTION

The present invention provides a vehicle tracking and security system which provides round-the-clock vehicle security, allowing immediate response in case of vehicle theft, an accident, vehicle breakdown, or other emergency.

Guardian and tracking functions are provided through Mobile Units which are preferably installed in hidden locations in vehicles to be monitored. The Mobile Units communicate with a Control Center in at least one-way, and preferably two-way, communication. Preferably, the Mobile Unit provides vehicle theft and intrusion protection using a in-vehicle alarm and security system linked to the Control Center by a transceiver in the Mobile Unit. Also, a keypad or other human interface device is provided in the vehicle, allowing a vehicle driver or occupant to signal the Control Center that a particular type of assistance is needed. The vehicle's location may be automatically transmitted to the Control Center along with any automatic or manual request, the location being precisely determinable anywhere in the world. In this manner, the present invention provides continuous monitoring of a large number of vehicles for a broad range of status and emergency conditions over a virtually unlimited geographic area, also allowing manual communication of requests for assistance to that specific location. Advantageously, the system is implemented using existing location-detection systems and conventional commercial or police communications equipment.

According to a first aspect of the invention, there is provided a mobile unit for a vehicle monitoring system, the mobile unit having an input unit responsive to an event or condition associated with the vehicle, and providing information describing the event or condition. The mobile unit also has a satellite receiver (preferably GPS), responsive to navigation signals transmitted by a satellite navigation system, and providing information describing the vehicle's location based on the navigation signals. Also, the mobile unit has a mobile unit controller, responsive to the input unit and the satellite receiver, the mobile unit controller including a cellular telephone transmitter for transmitting information onto a cellular telephone communications link, the information transmitted on the cellular telephone communications link including both (1) the information describing the event or condition and (2) the information describing the vehicle's location, the mobile unit controller automatically inserting the information describing the vehicle's location into the information transmitted onto the cellular telephone communications link.

According to another aspect of the invention, there is provided a mobile unit for a vehicle monitoring system, the mobile unit having a vehicle alarm system, responsive to an alarm event or alarm condition associated with the vehicle, and providing information describing the alarm event or alarm condition. The mobile unit also has a satellite receiver, responsive to navigation signals transmitted by a satellite navigation system, and providing information describing the vehicle's location based on the navigation signals. The mobile unit also has a mobile unit controller, responsive to the vehicle alarm system and the satellite receiver, the mobile unit controller transmitting information onto a communications link, the information transmitted on the communications link including both (1) the information describing the alarm event or alarm condition and (2) the information describing the vehicle's location, the mobile unit controller automatically inserting the information describing the vehicle's location into the information transmitted onto the communications link.

The invention further provides a mobile unit for a vehicle monitoring system, the mobile unit having an input unit, responsive to an event or condition associated with the vehicle, and providing information describing the event or condition, and a location unit providing information describing the vehicle's location. The mobile unit also has a cellular telephone transmitter including means for determining whether or not the transmitter is in range of a cellular telephone network, and transmitting information onto a cellular telephone communications link when the transmitter is in range of a cellular telephone network. The mobile unit has a mobile unit controller, responsive to the input unit and the location unit. The mobile unit controller has a storage device, the storage device including a storage area for storing both (1) the information describing the event or condition and (2) the information describing the vehicle's location in association with each other; and a processor, interacting with the cellular telephone transmitter and controlling the storage device. The processor performs the functions of i) storing in the storage device (1) the information describing the event or condition and (2) the information describing the vehicle's location in association with each other, when the transmitter is not in range of a cellular telephone network; and ii) retrieving from the storage device (1) the information describing the event or condition and (2) the information describing the vehicle's location in association with each other, when the transmitter is in range of a cellular telephone network.

The invention also provides a mobile unit for a vehicle monitoring system, the mobile unit having an operator input device having a number of inputs characterizing approximately four distinct predetermined messages, the operator input device providing information describing a chosen message when one or more inputs relating to the chosen message are activated by an operator. The mobile unit also has a satellite receiver, responsive to navigation signals transmitted by a satellite navigation system, and providing information describing the vehicle's location based on the navigation signals. The mobile unit also has a mobile unit controller, responsive to the operator input device and the satellite receiver, the mobile unit controller transmitting information onto a communications link, the information transmitted on the communications link including both (1) the information describing the chosen message and (2) the information describing the vehicle's location, the mobile unit controller automatically inserting the information describing the vehicle's location into the information transmitted onto the communications link.

The invention also provides a control center for a vehicle monitoring system having mobile units mounted in respective vehicles and a communications link between the mobile units and the control center. The control center has a control center display portion including one or more display screens displaying one or more maps with symbols of vehicles sending messages to the control center; and real-time display software allowing the symbols of the vehicles sending messages to be displayed substantially in real-time. The control center also has at least about eight communications interface devices coupled to the communications link, receiving sporadically-timed messages from the mobile units, and outputting the messages. The control center also has a control center buffer portion coupled to the control center display portion, the buffer portion responsive to the messages output by the communications interface devices. The buffer portion includes means for examining the messages received, means for generating individual responses to the messages received from respective vehicle mobile units based on the examination of the messages, the means for generating individual responses being coupled to the communications link and to the control center display portion, and means for providing to the control center display portion certain messages that have passed the examination, the messages allowing the real-time display software to display the symbols of the vehicles sending the messages that have passed the examination.

The invention also provides a vehicle monitoring system having an ambulatory operator input device adapted for an operator to carry away from a vehicle, the ambulatory operator input device providing information describing a message when activated by the operator. The monitoring system also has a mobile unit adapted for attachment to a vehicle. The mobile unit includes a local receiver including means to communicate with the ambulatory operator input device, the local receiver receiving the message when activated by the operator; a location unit providing information describing the vehicle's location; and a mobile unit controller, responsive to the local receiver and the location unit, the mobile unit controller transmitting information onto a communications link, the information transmitted on the communications link including both (1) the message and (2) the information describing the vehicle's location, the mobile unit controller automatically inserting the information describing the vehicle's location into the information transmitted onto the communications link.

The invention also provides a control center for a vehicle monitoring system having a plurality of mobile units mounted in respective vehicles and a communications link between the mobile units and the control center. The control center includes a control center display portion, including display screens displaying one or more maps with symbols of vehicles sending messages to the control center. The control center also has a satellite reference receiver, responsive to navigation signals transmitted by a satellite navigation system, and providing information describing the control center's location based on the navigation signals. The control center has a control center communications controller, the control center communications controller being responsive to messages received from the mobile units and coupled to the control center display portion and to the satellite receiver. The communications controller includes means for extracting from the messages received vehicle position information that is derived from vehicle position information provided by a mobile unit satellite receiver receiving navigation signals transmitted by the satellite navigation system; means for adjusting the vehicle position information in accordance with a drift error correction term derived from the navigation signals, to provide adjusted vehicle position information; and means for providing to the control center display portion the adjusted vehicle position information s that the control center display portion displays the symbols of the vehicles on the one or more maps in accordance with the drift error correction term.

Other objects, features, and advantages of the present invention will become apparent on reading the following Detailed Description in conjunction with the accompanying drawing figures.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 2A and 2B constitute a block diagram which schematically illustrates further details of the preferred Mobile Unit of FIG. 1. FIG. 2A and 2B are collectively referred to herein as "FIG. 2."

DETAILED DESCRIPTION OF THE PREFERRED EMBODIMENTS

Figure 1:
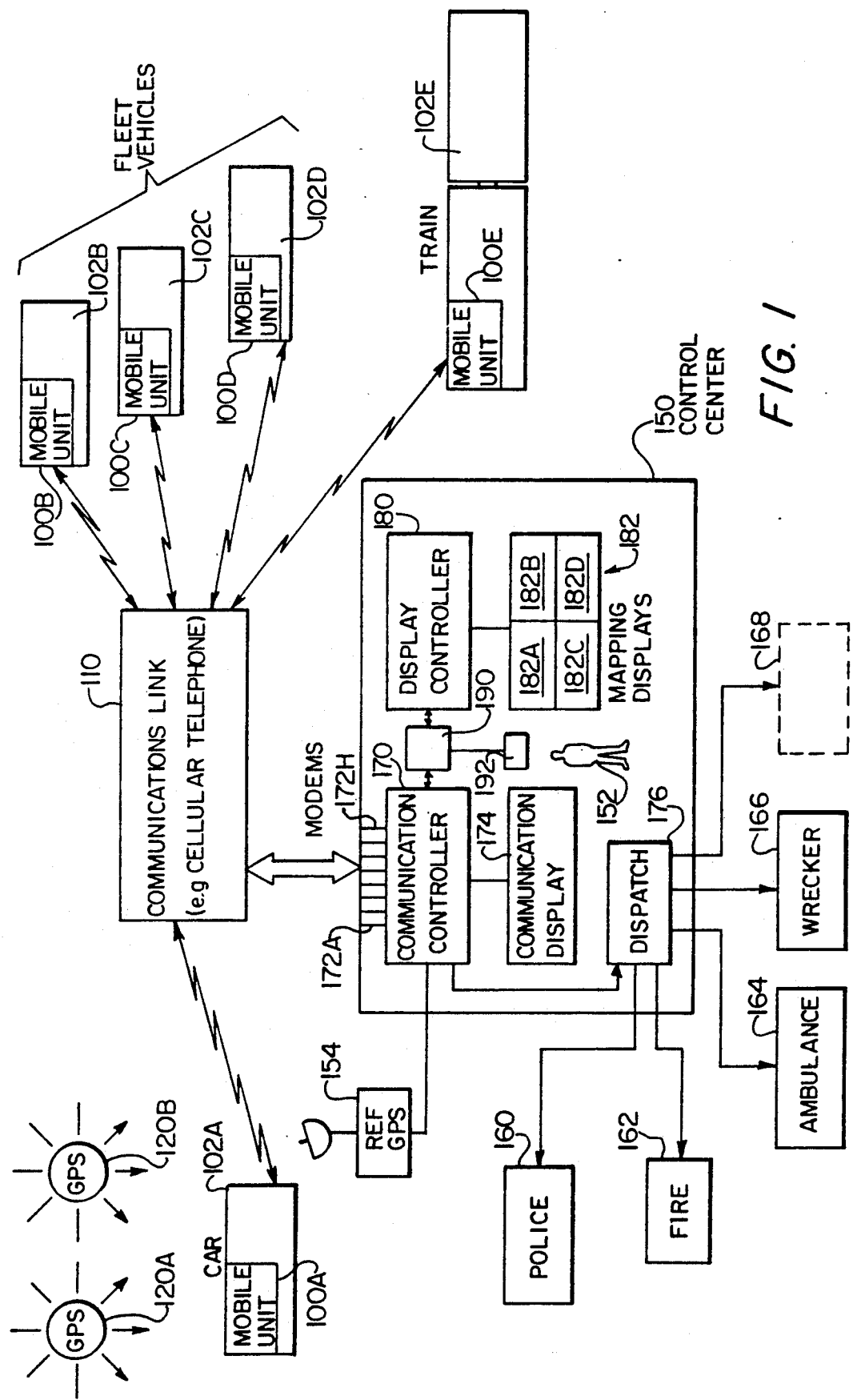
FIG. 1 is a high-level block diagram of the preferred vehicle tracking and security system according to the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Stated generally, the invention is a multi-featured electronic tracking and security system which includes devices that calculate a vehicle's position, detect local events, and calculate a system response based on weighted variables. Based on the calculated response, the system notifies the vehicle occupants. In certain circumstances, the system notifies a Control Center via a preferably two-way communication channel, to allow the Control Center to respond appropriately such as by summoning emergency vehicles or remotely controlling the vehicle in some way. Provision of a two-way communication system allows the Control Center to positively verify the message which was sent by the vehicle.

The preferred embodiment of the present invention provides computerized graphic maps which display vehicle locations using information ultimately derived from the existing Global Positioning System (GPS), thereby providing a highly accurate, real-time vehicle tracking system. The preferred system provides an integrated location system, communication network, mapping system, and dispatch capability. The system is especially suitable for use in fleet vehicle management, vehicle theft deterrent, stolen vehicle tracking, railroad car tracking, cargo location, and so forth. The system may be customized to a particular user's needs and, due to the preferred embodiment's use of the GPS, may be installed and used virtually anywhere in the world.

Referring to FIG. 1, the invention involves a set of "Mobile Units" 100A-100E which are provided on respective vehicles 102A-102E that are to be monitored, protected, or tracked. A communications link 110 is provided between the Mobile Units (hereinafter collectively indicated 100) and a "Control Center" 150 which is manned by one or more trained operators 152. The Mobile Unit may automatically detect certain status and alarm conditions, or a driver or passenger in the vehicle may manually request certain assistance, both of which actions may be immediately communicated to the Control Center along with automatically generated GPS-derived positioning data. The Control Center operator may take action as appropriate, including dispatching of emergency vehicles 160, 162, 164, 166, 168, commanding the appropriate Mobile Unit 100 to repeatedly transmit position data, or ignoring the Mobile Unit's communication. Certain functions may be either automated or manually controlled by the Control Center operator, such as whether the vehicle horn is sounded in response to an unexpected motion sensor activation indicating theft of the vehicle.

In particular, the vehicles may include a conventional passenger automobile 102A, a set of fleet vehicles 102B, 102C, 102D (such as buses or other mass transit vehicles, courier vehicles, delivery vehicles, utility vehicles, sanitation trucks, armored cars, police cars, rental cars, and so forth), as well as a train 102E. The communications link 110 is preferably implemented as a conventional cellular telephone link, but of course need not be so limited. The Control Center 150 may appropriately summon help in the form of police 160, a fire truck 162, an ambulance 164, a wrecker 166, or other appropriate help, generally indicated as element 168. Each Mobile Unit 100 preferably includes means for determining the present location of the vehicle 102 in which it is installed. Preferably, this means for determining the location is a Global Positioning System (GPS) receiver, not only for its accuracy but because the location information transmitted from GPS satellites is provided free of cost.

As readily appreciated by those skilled in the art, the GPS was developed by the U.S. Department of Defense and placed into service in the 1980's. The GPS includes a constellation of radio-navigation satellites which constantly transmit precise timing and location information to substantially the entire surface of the earth. The GPS receiver in the Mobile Unit is preferably implemented using a multi-channel GPS receiver so as to acquire many (for example, five) transmissions from a corresponding plurality of GPS satellites simultaneously. This allows the Mobile Unit to determine the location of the vehicle (within approximately 20 meters), velocity (to within 0.1 mph), and direction of motion, for possible transmission to the Control Center 150. Various GPS satellites are schematically illustrated at 120A, 120B. The Control Center 150 is equipped with a reference GPS receiver 154 to provide selectable real-time error correction of the measurements of the locations of the vehicles, using differential GPS techniques.

The reference GPS receiver 154 allows for real-time correction of GPS errors. By determining "drift" in the GPS signals, the output of the reference GPS receiver effectively provides a correction factor which may be subtracted from the position data transmitted by the vehicles. Preferably, a time history of the GPS "drift" is stored in the communications controller, so that any information stored in a Mobile Unit but transmitted at a later time may be properly correlated with earlier "drift" information for correction. According to a preferred embodiment, the drift correction algorithm may be switched on and off by the communications controller operator, so as to cause the incoming measurements to be corrected, or not corrected, based on operator choice.

The present invention preferably use a simple "difference GPS" adjustment, in contrast to the known "differential GPS" correction which is more costly and complex. The reference GPS receiver may be of the same, economical type used in the mobile units, in contrast to the costly units used in differential GPS systems. The Control Center difference GPS adjustment involves subtraction of the drift in the (known) location of the Control Center from location information transmitted by the mobile units. This unidirectional data flow is in contrast to differential GPS systems which derive and transmit a correction factor to the mobile unit, which mobile unit then applies the correction factor before transmitting back a corrected location.

The Control Center 150 includes a communication controller 170 and a display controller 180, there being a suitable conventional interface 190 therebetween. For example, the interface 190 may be a local area network (LAN) interface, having one or more terminals 192 allowing control center operator 152 to enter information into the controllers. Terminals 192 are understood to include any of a variety of input devices such as a keyboard, mouse, trackball, or other user interfaces.

The preferred Control Center includes a plurality of modems 172A . . . 172H disposed between the communications link 110 and the communications controller. In the illustrated embodiment, the modems 172A . . . 172H provide an interface between conventional telephone lines and a communications controller processor within communications controller 170.

The communications controller 170 serves as a buffer between the Mobile Units 100 and the display controller 180. Data passing through the communications controller 170, as well as general communications status information, is displayed on a communications display 174. The display controller 180 is provided with a plurality, preferably four, mapping displays 182A, 182B, 182C, and 182D. The mapping displays, collectively referred to as element 182, display information regarding the vehicles in a graphic manner, such as on pre-existing digitized maps of arbitrarily large geographical areas.

Based on information displayed on mapping displays 182, or noted on the communications display 174, the Control Center operator 152 may contact the police 160, fire department 162, ambulance 164, wrecker 168, or other suitable emergency vehicle 168, on a dispatch means 176. The dispatch means 176 may be an ordinary telephone for manual dialling by a human operator, or it may be any other suitable means of rapidly communicating with the emergency services. For example, any conventional means for automatically dialling a pre-programmed telephone number may be used, with the communications controller providing the order to call a given number. More elaborate embodiments involve message delivery systems to communicate particular messages to the telephone number thus called, thus bypassing the human operator if the system designer so desires. Thus, the dispatch means 176 may be connected to the communications controller 170 so that, under controlled circumstances, the emergency services may be summoned automatically, without intervention of the Control Center operator 152. However, in most practical embodiments, it is preferred that the display controller 180 simply provide information on a mapping display 182B, 182C or 182D, so that the operator may exercise human judgment before an emergency service is called.

The structure of the preferred embodiment of the Mobile Unit is described below, with reference to FIGS. 2, 3, 4 and 5. Operation of the Mobile Units in conjunction with the Control Center is explained with reference to FIGS. 6-9. Operation of the Control Center in conjunction with the Mobile Units is described with reference to FIGS. 10A-17.

Figure 2B:
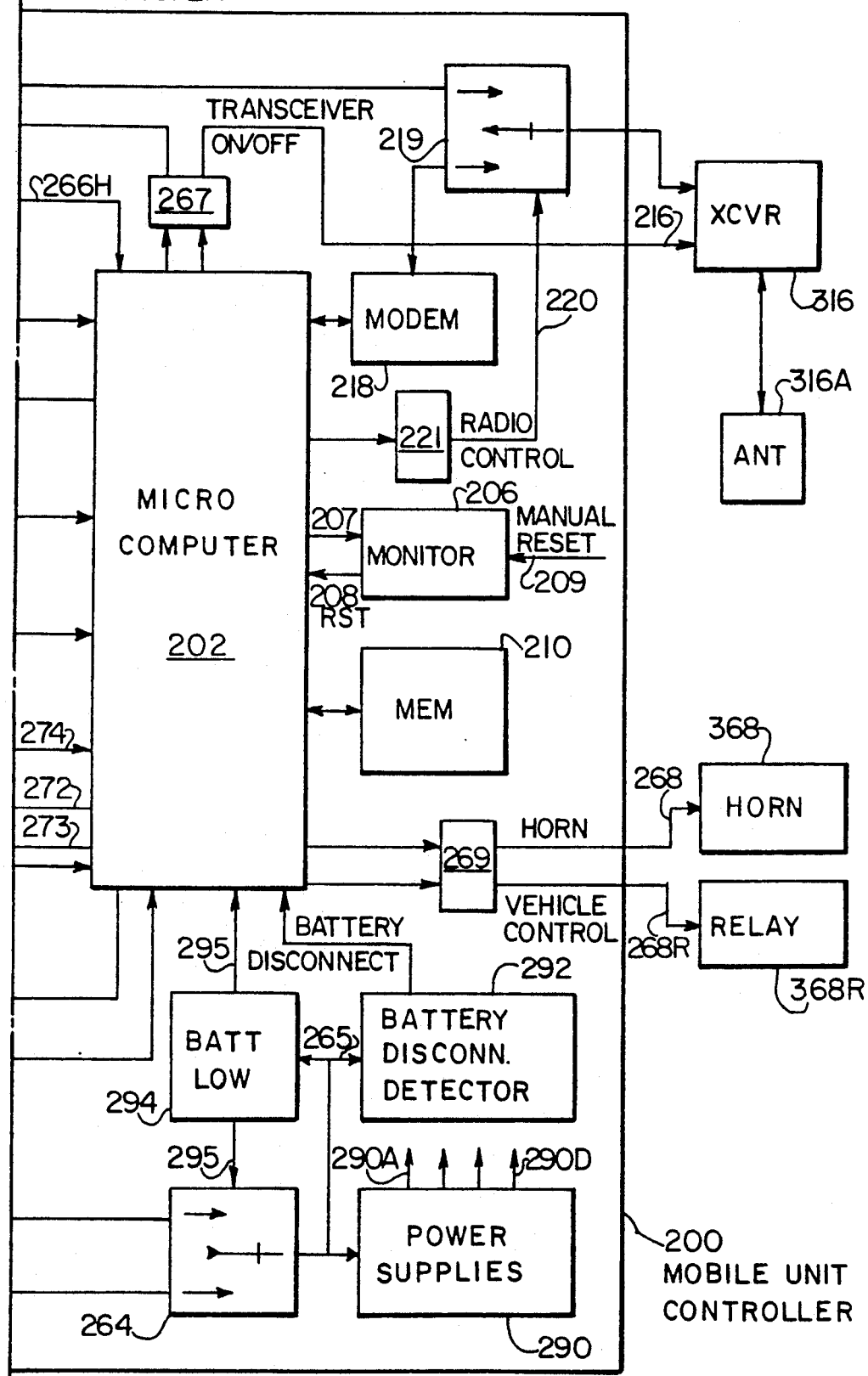

FIG. 2 illustrates a preferred Mobile Unit controller 200 in conjunction with various other elements within a preferred Mobile Unit 100. FIG. 2 illustrates major components of the Mobile Unit, it being understood that conventional elements whose functions are not critical to an understanding of the present invention are omitted. For example, optical isolators, level translators, crystal oscillators, buffers, bus transceivers, drivers, protection circuits, voltage regulators, and other auxiliary functional circuits are omitted from FIG. 2 and the present specification, for the sake of clarity. Those skilled in the art are readily capable of implementing the present invention, given the present discussion. The elements which are schematically illustrated in FIG. 2 are presented literally in FIG. 3.

Figure 3:
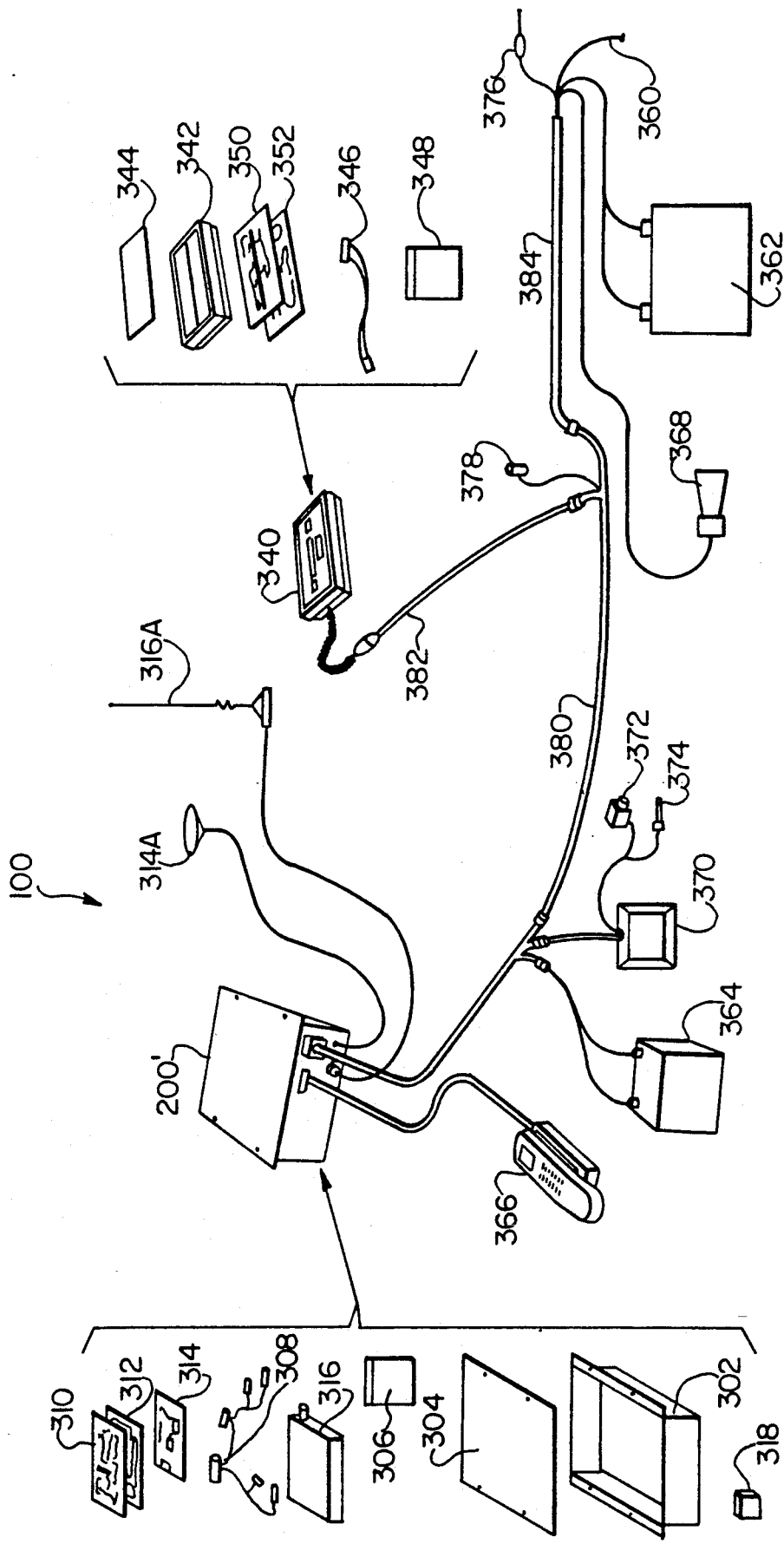
FIG. 3 is a diagram illustrating components of a preferred Mobile Unit as including various sensing, power, and data input devices.

FIG. 3 is a perspective view, partially exploded, of the components of the preferred Mobile Unit 100. The main component of Mobile Unit 100 is Mobile Unit controller box 200'. Mobile Unit controller box 200' is housed in a chassis 302 with a chassis lid 304. The components of Mobile Unit controller box 200' are held together and connected by commonly available hardware 306 and a suitable wiring harness 308.

The essential components in the Mobile Unit controller box are a controller PC board 310, a power PC board 312, a commercially available GPS (Global Positioning System) receiver 314, and a suitable transceiver (such as a commercially available cellular telephone transceiver) 316. To preserve the data contents of volatile memory in the Mobile Unit controller, a memory back-up battery 318 is provided. The Mobile Unit controller 200, as such, is not considered to include the GPS receiver or transceiver, although the boards for these devices are shown in FIG. 3 to be in the Mobile Unit controller box 200'.

A global positioning system antenna 314A is provided, external to the Mobile Unit controller 200. The GPS antenna 314A is connected to the GpS receiver 314.

An optional auxiliary position determination unit 390 is provided, to provide position information when the GPS receiver is not functioning properly o when the vehicle is in a "blank area" in which an insufficient number of GPS satellite signals are being received with acceptable signal quality. The auxiliary position determination unit may also be employed when a "bad data" bit is set in the GPS receiver, indicating that, for some reason, transmissions received by the GPS receiver are not yielding accurate or meaningful results.

The auxiliary position determination unit 390 may itself comprise a microcomputer of conventional design, with suitable bus and communication interface structures. The auxiliary position determination unit 390 is connected to microcomputer 202 through a suitable interface, such as RS-232 interface 290I.

Connected to the auxiliary positioning determination unit 390 are one or more devices allowing extrapolation of position based o position and direction data previously provided through the GPS receiver 314. For example, a gyroscope 391, differential wheel rotation sensor 392, accelerometer 393, and flux gate compass 394 are illustrated. Using position data and direction data previously calculated by the system using the GPS, one or more of the elements 391, 392, 393, 394 can provide further information by which the auxiliary position detection unit 390 may calculate the present position of a vehicle, using dead reckoning or other conventional extrapolation algorithms.

In general, if an auxiliary position determination device is provided in a system, it is preferred that more than one device 391–394 be employed. For example, it is known that by sensing rotation of opposite wheels on a vehicle, changes in direction of the vehicle may be measured; often, however, resulting direction measurements are not accurate. Use of a flux gate compass provides generally more accurate directional information after the vehicle has turned many times, but suffers from interference from outside sources. A gyroscope provides more accurate directional information, but is often too costly for many applications. An accelerometer is advantageous, as it is both economical and miniaturized. Use of two or more of these devices allows greater overall location and directional information to be derived. Generally, however, the auxiliary positioning elements 390–394 are provided as a supplement to the GPS receiver 314, and are not generally envisioned as a replacement for it due to accuracy and cost considerations.

Figure 4:
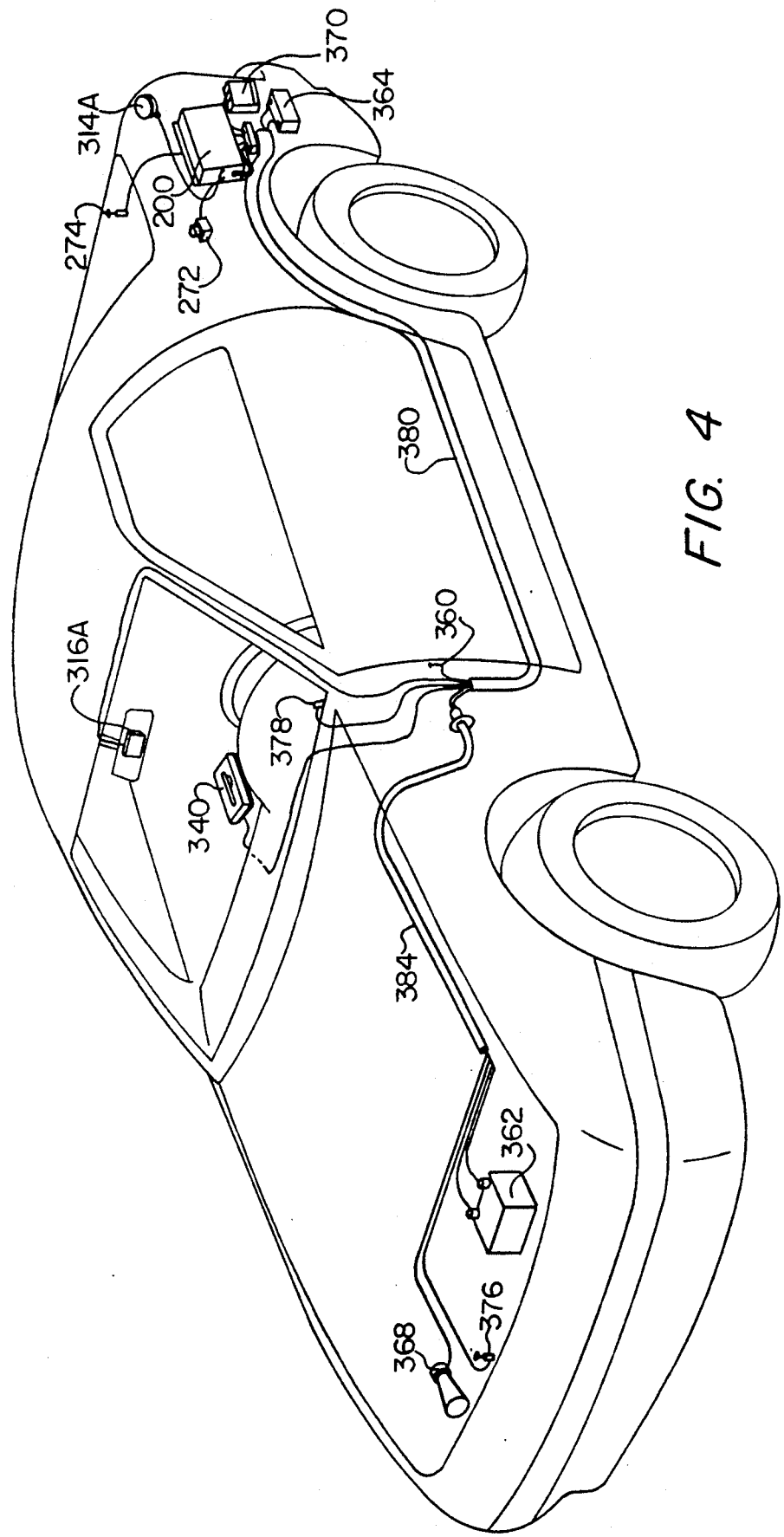
FIG. 4 is a perspective drawing of a vehicle using the elements of FIG. 3.

Auxiliary position determination unit 390 is not specifically illustrated in FIGS. 3 or 4. However, if provided, the auxiliary position determination unit 390 is preferably placed near the mobile unit controller, with position or direction sensing elements 391–394 located as close as their respective functions allow.

Referring again more generally to FIGS. 2 and 3, a cellular telephone antenna 316A is also provided, and is connected to the transceiver 316. Of course, in embodiments using a system other than cellular telephone, transceiver 316 and antenna 316A would be chosen differently, in accordance with principles known to those skilled in the art. For example, satellite communications systems, or two-way UHF or VHF radios, especially suitable for use with fleet vehicles, involve their own specific transceivers which may be chosen and installed in accordance with principles known to those skilled in the art. Factors influencing the decision of which communications system to use include the frequency of monitoring intervals, the expected geographical coverage area, the size of the vehicle, the amount of information to be transmitted, and the authorized and available frequencies within the expected geographical coverage area.

A human interface such as keypad 340 is provided, preferably in the passenger compartment of the vehicle, at a point accessible to the driver or a passenger. The keypad 340 is shown as including a box 342 with a face plate 344 mounted thereon, the components contained within the box. The components are connected and attached to each other appropriately, with flex cable 346 and suitable hardware 348. Essential components in keypad 340 include a keypad PC board 350 which may be of conventional design, as well as a conventional microprocessor printed circuit board 352.

FIG. 3 illustrates the ignition wire 360 and the vehicle battery 362 in a normal configuration. However, according to the preferred embodiment of the Mobile Unit, a back-up battery 364 is provided to power the Mobile Unit components in the event that the vehicle battery is stolen, discharged, or otherwise incapable of powering the Mobile Unit.

A cellular telephone handset 366 may also be provided. In one embodiment, a handset 366 is provided only for testing purposes. However, in a second embodiment, the handset 366 may be provided in the passenger compartment of the vehicle, allowing the vehicle occupants to have cellular telephone service without having to buy a separate cellular transceiver. In the first embodiment, the keypad 340 is used as the only operator input to the system. In the second embodiment, the handset 366 may provide an additional, more flexible way of communicating voice information to a greater number of destinations.

In addition to providing vehicle monitoring functions, the present invention provides vehicle control functions. For example, upon detection of an alarm condition such as a vehicle break-in, the system may activate the vehicle's alarm horn 368. It is understood that alarm horn 368 is represented as but one example of the control the system may exert on the vehicle. It is also envisioned that more drastic measures, such as cutting power to the vehicle to disable it, may be invoked in the event of a detected theft.

Detection of various status and emergency conditions may be made through suitable means, such as commercially available alarm system 370. The alarm system 370 which is illustrated in FIG. 3 is shown connected to a motion sensor 372 for detecting movement (and possible theft) of the vehicle. Alarm system 370 is also shown connected to a "trunk lid open" sensor 374, a "hood open" sensor 376, and a "glass breakage" sensor 378.

Referring more specifically to FIG. 2, a preferred hardware implementation of the Mobile Unit controller 200 is shown schematically, connected to the various elements also illustrated in FIG. 3.

In FIG. 2, a microcomputer 202 governs operations. Block 102 is understood to include a conventional microprocessor, such as an SC87C51, along with its associated data bus, address bus, control bus, program and storage memory elements as well as any incidental power, interface and buffering elements such as UART's (universal asynchronous receiver transmitters).

The microcomputer 202 controls whether various hardware elements in the Mobile Unit are powered on or powered off. For example, the microcomputer may turn handset 366 on or off using a Handset On/Handset Off control signal on path 266, a control signal which is preferably latched in a latch 267. The latch may be a 74HC374. Further, the transceiver 316 may be powered on or powered off using a control signal on path 216, which is also preferably latched in a suitable manner. Further, GPS receiver 314 may be turned on and off using a signal on path 214, the signal being latched in a latch 215. Finally, in alarm systems 370 which have a remote "alarm on/alarm off" function, the present invention provides an ALARM ON/ALARM OFF signal on path 273, the signal being latched in a latch 271.

Microcomputer 202 is also capable of controlling portions of the Mobile Unit hardware, or even of other portions of the vehicle outside the Mobile Unit itself. For example, the invention provides an ALARM SYSTEM RESET signal on path 272, the ALARM SYSTEM RESET signal being latched in latch 271. The microcomputer 202 may activate alarm horn 368, using a HORN signal on path 268 which is latched in a latch 269. Also, the present invention envisions a broader range of vehicle control, as is generally indicated by a VEHICLE CONTROL signal provided on path 268R to a vehicle control relay schematically indicated a element 368R. Element 368R may be embodied as a remotely controllable electrical relay which ma be remotely tripped open so as to prevent power from reaching a fuel pump, for example. The VEHICLE CONTROL signal on path 268R is also latched in latch 269.

Power is provided to the Mobile Unit elements in the following manner. The vehicle battery 362 is connected to an overvoltage protector 262 which is connected to a noise filter 263. The output of the noise filter 263 is connected to a first input of a backup battery switchover circuit 264. A second input of the backup battery switchover circuit 264 is connected to the backup battery 364. Backup battery switchover circuit 264 provides at its output node 265 one of the outputs of noise filter 263 or backup battery 364, based on the value of a control input 295. The voltage level at node 265 is provided to a bank of power supplies, schematically indicated as element 290. Power supplies 290 provide power at suitable voltages for use by the various Mobile Unit controller components. In a preferred embodiment, regulated voltages of 5 VDC, 9 VDC, 12 VDC, and a reference voltage suitable for use in operational amplifiers, are provided on paths 290A . . . 290D.

A "disconnected battery" detector 292 continuously determines whether the voltage provided on node 265 is below a given threshold (preferably 1.2 V). Upon detection of a voltage drop below 1.2 V, the "disconnected battery" detector provides a BATTERY DISCONNECT signal to microcomputer 202 on path 293. This signal may be used to alert the Control Center to possible theft of the battery, or generally to indicate that powering of the Mobile Unit is in danger.

A "low battery voltage" detector 294 is provided. Low Battery Voltage Detector 294 substantially continuously monitors the voltage on node 265 to determine when it falls below a predetermined threshold (preferably 11.5 VDC). When this voltage falls below the threshold, the Low Battery Voltage Detector 294 provides a BATTERY LOW signal to microcomputer 202 on path 295.

The BATTERY LOW signal on path 295 is also input to the control input of backup battery switchover circuit 264, so as to control whether the backup battery 364 or the vehicle battery 362 provides the power to node 265. When a low battery condition is detected by detector 294, backup battery 364 provides power so that voltage levels remain within acceptable tolerances for the various system components receiving power on paths 290A . . . 290D. It is understood that element 264 is illustrated schematically, and that, in the preferred embodiment, element 264 may include a re-charger unit to re-charge backup battery 364.

According to the present invention, any of a variety of commercially available alarm systems 370 may be employed. To provide this flexibility, a universal alarm interface 270 is provided. The universal alarm interface 27 accepts alarm signals from alarm system 370, to provide a digital ALARM signal on path 274 to the microcomputer 202. In the preferred embodiment, the universal alarm interface 270 includes, in series, an alarm polarity select or inhibit circuit, an overvoltage protection circuit, and a time delay circuit. The alarm polarity select or inhibit circuit preferably includes a manual jumper which allows the installer to adapt the interface to the polarity convention adopted by the alarm system 370. That is, the universal alarm interface allows use of different alarm systems, regardless of whether the alarm systems use a "high" voltage or a "low" voltage to indicate an alarm condition. The overvoltage protection circuit limits the magnitude of the alarm signal from the alarm system 370. The time delay circuit ensures that an alarm condition endures for a given time period, such as three seconds, to minimize "false alarms". Of course, alterations of and additions to the preferred universal alarm interface lie within the scope and contemplation of the invention. After the alarm system's alarm signal of the correct polarity has been reduced in size and determined to be of sufficient length to warrant an alarm condition, the universal alarm interface thus provides a digital ALARM signal to microcomputer 202 on path 274.

The present invention allows the microcomputer 202 to communicate with GPS receiver 314 using a conventional interface, such as an RS-232 interface 214I. Data passing between the microcomputer 202 and the GPS receiver 314 is converted between RS-232 signals (on the GPS receiver side of the interface) to digital signals (on the microcomputer side of the interface). In this manner, microcomputer 202 may interrogate the GPS receiver as to the present longitude, latitude, time, date, and status of the GPS receiver. These higher-level functions are provided, in addition to the GPS ON/GPS OFF signal which is provided on path 214.

The invention allows remote monitoring of whether or not the vehicle ignition is on. The ignition status of the car, schematically illustrated as 360, is provided to microcomputer 202, after passing through a suitable ignition interface and buffer 260.

As discussed above, keypad 340 allows a user to manually enter information or requests for assistance. The keypad is shown connected to microcomputer 202 through a suitable line driver 240. Preferably, line driver 240 employs the RS-485 interface standard, allowing substantial noise tolerance over the pathway from the keypad in the passenger compartment to the Mobile Unit controller in the trunk of the vehicle. The keypad is provided with displays 340D, so as to verify to the vehicle occupant that his information entry or request for assistance has been received by the microcomputer, or by the Control Center. A suitable line driver 240D is provided between the microcomputer and the display 340D.

Also illustrated in FIG. 2 is an optional local receiver or transceiver 234 linked to the microcomputer 202 by a suitable interface such as RS-232 interface 236. The local transceiver is provided with an antenna 232 by which it communicates with a portable (preferably hand-held) unit 230. Portable unit 230 is a one- or two-way radio serving as an ambulatory operator input device. Portable unit 232 is especially suitable for use by law enforcement authorities, as it allows them to communicate through the Mobile Unit when they are away from the vehicle. The portable unit may be of standard design, such as a Model No. SK911T made by SECO-LARM, 17811 Sky Park Circle, Irvine, Calif. 92714. SECO-LARM also provides the antenna 232 and receiver 234 as Model No. SK911RM, avoiding the need for an RS-232 interface 236.

The portable unit may be of simple design, with a single "panic button" which signals the controller 200 to send for help to the Control Center. Alternatively, portable communicators of greater flexibility may be employed, to allow a greater number of messages to be entered from the portable unit. Simpler designs involve transmitters only, in which element 234 is merely a receiver. If the portable unit is equipped as a receiver as well as a transmitter, it may receive return messages, such as one indicating "help is on the way". If portable unit 230 is a transceiver, so must element 234 be a transceiver, to allow bi-directional communication.

According to the preferred embodiment, the microcomputer is provided with a monitor 206, preferably a DS1232 Micromonitor. Periodically, the microcomputer provides a predetermined data word to the monitor 206 on path 207. If the monitor 206 has not received the predetermined data word from the microcomputer 202 in a given time period, monitor 206 provides a RESET command on path 208, thus resetting the microcomputer. The reliability of the Mobile Unit controller is thus enhanced, ensuring that a lock-up condition of microcomputer 202 does not permanently disable the Mobile Unit controller. A manual reset input 209 is also provided on the monitor, to manually reset the microcomputer.

A volatile or non-volatile storage device, such as memory 210, is illustrated so as to emphasize the ability of the Mobile Unit controller to store information it has received from any of its inputs, for later transmission to the Control Center. A log of events may be stored in memory 210, along with timing information received through GPS receiver 314. For example, if motion sensor 372 detects that the vehicle is being stolen, but the vehicle is out of range for cellular communication or there is a problem in the communications link preventing immediate communication with the Control Center, the microcomputer 202 can store the fact of the theft in memory 210, correlated with a contemporaneous read of the time and location received through GPS receiver 314. Upon repeatedly attempting to communicate with the Control Center by the communications link, microcomputer 202 may eventually transmit the fact, time of the motion detection and location to the Control Center, along with any events which have since occurred.

The Mobile Unit controller also includes a modem 218 (such as a model 6946, 300-BPS modem) which allows bi-directional communication over a standard cellular telephone link using transceiver 316. A switching arrangement 219 allows selective communication of the transceiver with either microcomputer 202 through modem 218, or to handset 366. Switching arrangement 219 is controlled by a RADIO CONTROL signal on path 220, which is latched in latch 221. As described in greater detail below, microcomputer 202 grants a higher priority to emergency communications entered through keypad 340 than it does to voice communications through handset 366. Thus, in the event that handset 366 is routed through switching arrangement 219 to communicate with the outside world through transceiver 316, but the vehicle operator enters a valid keypad sequence, the RADIO CONTROL signal on path 220 interrupts the voice communication from handset 366 to allow microcomputer 202 to communicate the keypad sequence via modem 218 and transceiver 316.

In view of the foregoing, it is clear that microcomputer 202 receives inputs from a variety of sources, and may take a variety of actions such as communicating with the Control Center using transceiver 316, communicating with vehicle occupants, or controlling the vehicle in some way.

In particular, microcomputer 202 is responsive to detected abnormalities in the voltage provided by vehicle battery 362. Also, microcomputer 202 is responsive to alarms detected by alarm system 370. Microcomputer 202 can also receive date, time, location, and status information from GPS receiver 314, after the microcomputer interrogates it for such information. Microcomputer 202 receives status information regarding whether the vehicle ignition is on. Microcomputer 202 also receives data from a keypad controller within keypad 340, determines an off-hook condition from handset 366 via ON HOOK/OFF HOOK path 266H, or receives signals such as calls for help from portable unit 230. Other sensory inputs envisioned by the present invention include odometer readings, passenger count, silent alarms, mechanical malfunctions (oil pressure, water temperature), tractor-trailer uncoupling, and so forth.

Microcomputer 202 may take actions in response to a variety of conditions. Commonly, it takes action in response to commands issued from the Control Center via transceiver 316 and modem 218. Further, it may take action in response to local events, such as an alarm detected by alarm system 370. Alternatively, microcomputer 202 may take action based on internally programmed conditions, such as expiration of a certain amount of time as determined by a clock internal to the microcomputer. Among the actions which the microcomputer may take are to turn the handset 366 and transceiver 316 on or off, turn the GPS receiver 314 on or off, turn the alarm system 370 on or off, reset the alarm system, communicate with portable handsets 230 that are embodied as transceivers, display information on the keypad display 340B, sound an alarm on vehicle horn 368, trip relay 368R, store information in storage device 210, or transmit data through transceiver 316. Significantly, microcomputer 202 may transmit information regarding local occurrences or status to the Control Center, through modem 218 and transceiver 316. Alternatively or additionally, microcomputer 202 may store information regarding these occurrences in memory 210 for later transmission, or local analysis by a program resident in the microcomputer.

For graphic clarity, Applicant has omitted the details of a preferred implementation of the Mobile Unit controller 200. For example, Applicant has not illustrated UART's (universal asynchronous receiver transmitters such as 81C17's) which buffer information between the microprocessor and various elements in FIG. 2. For example, a UART is provided between the microprocessor and ALARM signal path 274, and the keypad drivers 240, 240D. Also, a UART is provided between the microcomputer 202 and the modem 218. Further, a UART is provided between the microcomputer 202 and the GPS RS-232 interface 214I, between the microcomputer and the BATTERY DISCONNECT and BATTERY LOW signals on paths 293, 295, respectively.

The Mobile Unit controller according to the preferred embodiment is only 3 inches high, 9 inches deep, and 8 inches wide. The preferred Mobile Unit operates on a normal vehicle battery 12–16 volts DC. In Idle Mode, it consumes 300 milliamperes (mA) at 14 VDC, 750 mA in Alert Mode, and 1100 mA in Transmit Mode. The GPS receiver operates on the L1 frequency, C/A code, using a one- or multi-channel receiver. Subject to changes in Department of Defense civil GPS user policy, the position accuracy of the system is 20 meters, the velocity accuracy, 0.1 meters per second, and the time accuracy, greater than 0.1 seconds with respect to UTC.

The Control Center's display controller computer may be implemented using an INTEL 80486 processor or equivalent operating at 33 MHz, with 16 MB internal memory, a 120 MB tape backup, and a 210 MB hard disk. The Control Center's communications controller may be implemented using an INTEL 80286 processor or equivalent operating at 16 MHz, with 4 MB internal memory, a 44 MB hard disk, and 8 BSM Quikcomm 2400 baud external modems with enhanced RS-232 controllers for eight channels. The illustrated display controller is connected to four SVGA monitors, and the communications controller is provided with a single VGA monitor. A suitable printer is also provided. To ensure accuracy of vehicle location measurements against GPS drift, a GPS base reference is also be provided at the Control Center.

According to the preferred embodiment which is illustrated in FIG. 3, the Mobile Unit controller includes three cards, including a controller, PC board 310, a power PC board 312 and a GPS receiver board 314. Of course, the invention should not be limited to this implementation, as the combination of these functions, or a different division of the functions performed on these cards, lies readily within the ability of those skilled in art and within the contemplation of the present invention. However, in a particular preferred embodiment, the controller PC board 310 and the power PC board are separate, and connected by wiring harness cable 308 (FIG. 3). The controller printed circuit board 310 includes the microcomputer 202, monitor 206, the UART's and latches mentioned above, keypad line drivers 240, 240D, and modem 218. The controller PC board 310 plugs into a connector on the power PC board 312. Situated on Power PC board 312 are the overvoltage protector 262, noise filter 263, backup battery switchover circuit 264, power supplies 290, battery disconnect detector 292, low battery voltage detector 294, ignition interface 260, universal alarm interface 270, RS-232 interfaces 214I, 290I, switching arrangement 219, and various connectors leading to transceiver 316, horn 368, relay 368R, keypad and display 340, 340D, ignition 360, alarm system 370, vehicle and backup batteries 362, 364, and handset 366. Clearly, variations upon the preferred implementation lie within the ability of those skilled in the art.

FIG. 4 illustrates the Mobile Unit components deployed in a passenger car. In the illustrated deployment, the Mobile Unit controller 200, alarm sensor 370, backup battery 364, and GPS antenna 314A are hidden and protected in the left rear trunk compartment of the vehicle. In this arrangement, the particular system of cable connections shown in FIG. 3 is appropriate. For example, an under-carpet cable 380 extends forward from the trunk, under the carpet in the passenger compartment. The under-carpet cable 380 branches into a passenger compartment cable 382 and an under-hood conduit 384. Keypad 340 is connected to the end of passenger compartment cable 382, whereas vehicle battery 362, alarm horn 368, and hood sensor 376 extend from the under-hood conduit 384.

The handset 366 is illustrated as being directly connected to the Mobile Unit controller 200, in a testing configuration. However, if a handset 366 is provided in the passenger compartment, it is understood that it may be connected to transceiver 316 via the under-carpet cable 380 and passenger compartment cable 382. Likewise, cellular antenna 316A may be provided at an appropriate point, either near the rear of the car (as illustrated in FIG. 3) or in the front of the passenger compartment of the car (as illustrated in FIG. 4).

Variations in the placement of these components lie within the ability of those skilled in the art. For example, passenger cars and buses, freight trucks, courier trucks, and train cars each have a variety of suitable locations for securing system components out of the reach of thieves and vandals. Particular placement of components in the drawings should not limit the scope of the invention.

Referring again briefly to FIG. 3, keypad 340 is illustrated. Keypad 340 includes a keypad PC board 350 and a microprocessor PC board 352. Both PC boards 350, 352 may be of conventional design. For example, keypad PC board 350 may be any board which suitably supports a variety of keys for the vehicle operator to press. The keypad PC board 350 also would normally contain pathways from the keys to a connector leading to the keypad microprocessor PC board 352. Microprocessor PC board 352 may include a conventional microprocessor governing operations local to the keypad, and a communications controller chip to allow communication between the microprocessor and the Mobile Unit controller microprocessor 202 (FIG. 2). A conventional keyboard encoder may be provided on either board 350, 352, to report to the keypad microprocessor which key has been pressed.

Figure 5:
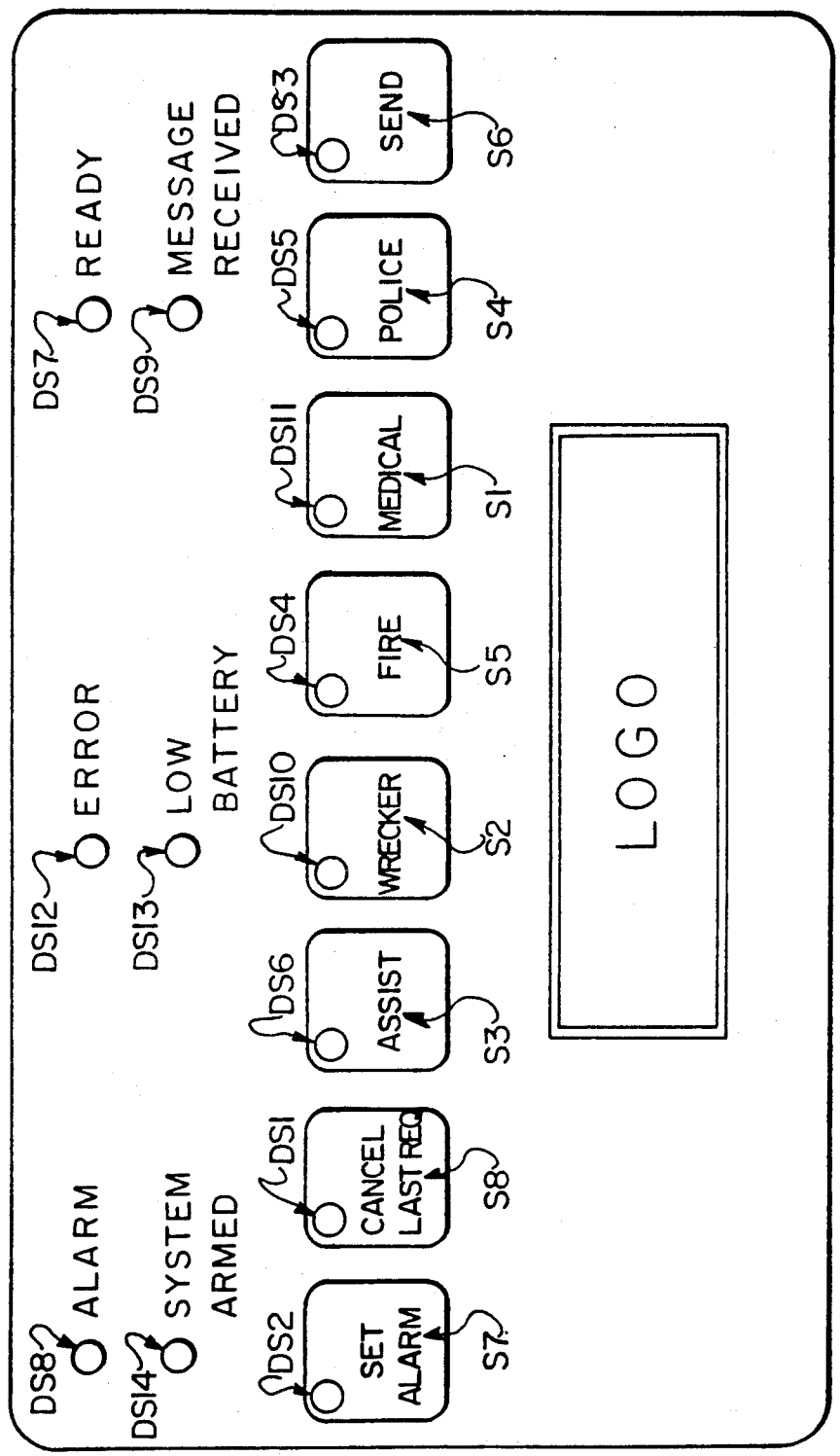
FIG. 5 illustrates a preferred keypad for use with the preferred Mobile Unit.

FIG. 5 illustrates a preferred arrangement of keys on keypad face plate 344 (FIG. 3). In FIG. 5, a variety of keys of the momentary contact type are indicated as S1, S2, S3 . . . S8. Also, corresponding display elements, preferably implemented as light emitting diodes (LED's) are illustrated, being labelled DS1, DS2, DS3 . . . DS14.

In the preferred embodiment, key closures are detected, and indicator lights are illuminated, in the following manner.

When the vehicle ignition is off, all LED's are off. When the ignition is turned on, all LED's are turned on for a one-second test period. After the one-second test period, only the READY LED remains illuminated.

When the keypad is powered on, and a key is depressed, the keyboard encoder notifies the keypad microprocessor, which then informs the Mobile Unit controller microcomputer 202 via communications link 240 (FIG. 2). Based on the key, or sequence of keys, which have been pressed, microcomputer 202 causes one or more display LED's (340D in FIG. 2) to be illuminated.

In the manner described above, when any of the keys S1 . . . S8 are depressed by the vehicle operator, microcomputer 202 causes a corresponding LED imbedded in the key to be illuminated. For example, if the vehicle operator wishes to summon an ambulance, he must depress the ASSIST, MEDICAL, and SEND keys in that order. As he strikes the ASSIST key, the microcomputer 202 learns of the closure as described above, and illuminates the LED imbedded in the ASSIST key. As the operator depresses the MEDICAL key, the microcomputer learns of the closure and illuminates the LED imbedded in the MEDICAL key, so that both the LED's in the ASSIST and MEDICAL keys are illuminated. Finally, when the operator presses the SEND key, the microcomputer learns of the closure and illuminates the LED imbedded in the SEND key. At this time, the three LED's respectively imbedded in the ASSIST, MEDICAL, and SEND keys are illuminated.

As described below, with reference to FIGS. 10A-14, the system processes the request for medical assistance. When the Control Center sends an ACK (acknowledge) signal back to the Mobile Unit microcomputer, the microcomputer darkens the LED's imbedded in the ASSIST, MEDICAL, and SEND keys, and illuminates the MESSAGE RECEIVED LED. Illumination of the MESSAGE RECEIVED LED confirms to the vehicle operator that his request for medical assistance has been received by the Control Center.

As described in greater detail with reference to FIG. 7, if the operator enters an illegal key sequence, the microcomputer senses the illegal sequence and illuminates the ERROR LED. At this time, the vehicle operator may attempt to re-enter his command.

The microcomputer also illuminates the ERROR LED when the Control Center has sent a NAK signal to the Mobile Unit. When the Mobile Unit receives a NAK signal from the Control Center, the microcomputer does not darken the LED imbedded the appropriate keys. Rather, it waits until the Control Center sends an ACK in response to the microcomputer's repeated attempts to communicate with the Control Center. This process is also described in greater detail below, with reference to FIG. 7.

The operator may cancel his most recent request by pressing the ASSIST key followed by the SEND key. The operator may cancel a current key sequence before depressing the SEND key, by pressing the CANCEL LAST REQ key.

To activate the alarm system 370 (FIGS. 2, 3), after the ignition is turned off, the vehicle operator presses the SET ALARM key. Sensing the closure of this switch, microcomputer 202 illuminates the SYSTEM ARMED LED, and commences a selectable time period, such as 30 seconds, for the vehicle operator to exit the vehicle and lock the doors. At the end of this time period, any intrusion which the alarm system 370 detects will be reported to the microcomputer which will respond accordingly, such as by sounding horn 368 (FIGS. 2 and 3) and/or by communicating the alarm condition to the Control Center. When an alarm condition is detected, microcomputer 202 illuminates ALARM LED on the keypad.

According to a preferred embodiment, if the keypad is disconnected from the system, or the communications link between the keypad and the Mobile Unit controller is otherwise interrupted, the microcomputer interprets this as an alarm condition.

Further, according to a preferred embodiment, the alarm condition cannot be cancelled without there being a key in the ignition. This feature ensures that the alarm condition is not cancelled by a thief or vandal before it can be reported to the Control Center.

The structure of a preferred Mobile Unit having been described with reference to FIGS. 1-5, the following is a description of its operation.

Much of the low-level support software for the Mobile Unit and Control Center components is either commercially available or readily capable of implementation by those skilled in the art. For example, conventional electronic mapping software and data base management software may be employed in the Control Center computers. For instance, QuickBASIC is preferably used for communications controller functions, and the "MapCode" language is preferably used with the "MapInfo" display software, both available from MapInfo Corporation. Any software or other functions which are not commercially available or readily capable of implementation by those skilled in the art, are described in detail adequate detail to enable those skilled in the art to make and use the present invention.

Figure 6:
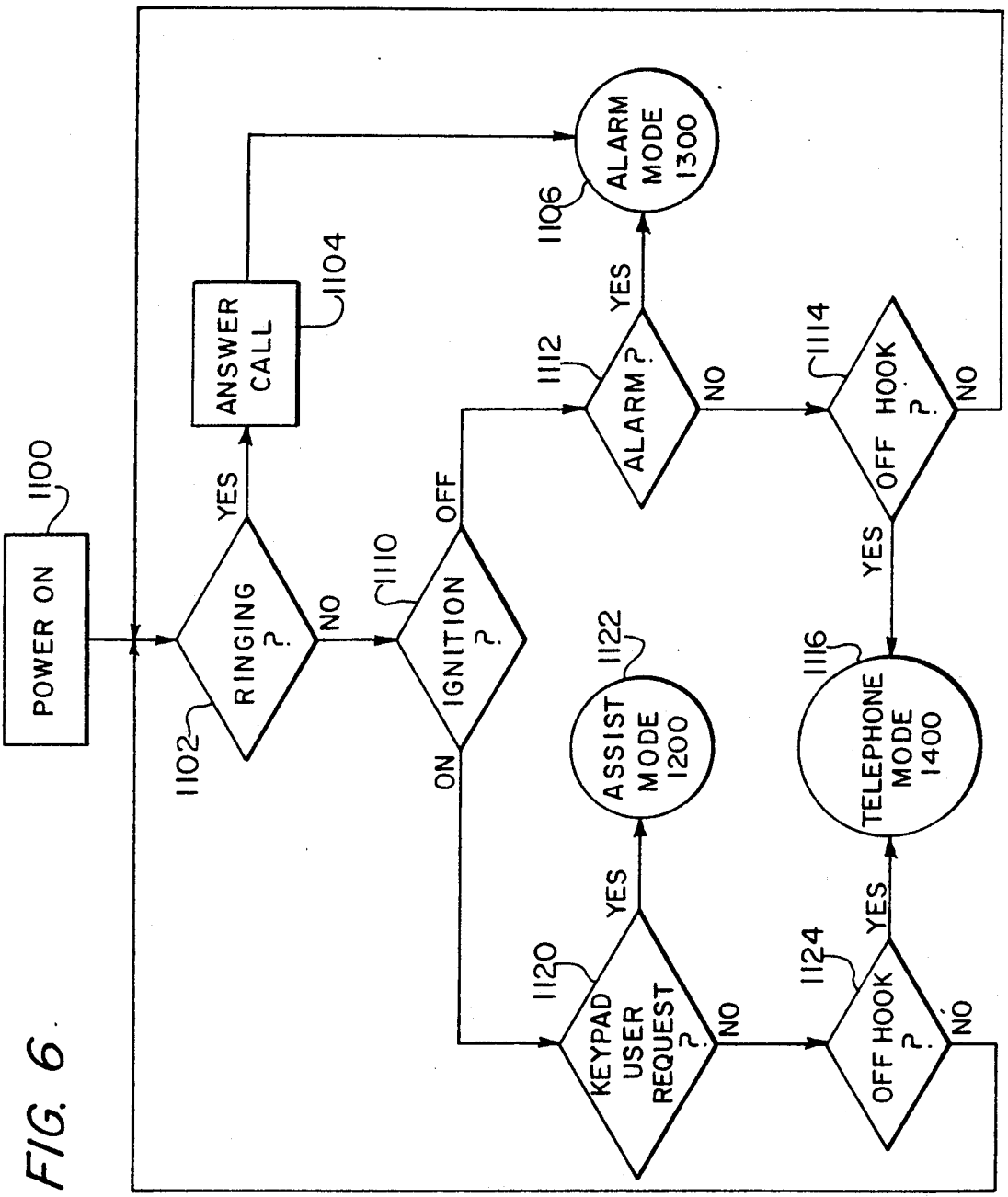
FIG. 6 is a flow chart illustrating operation of the preferred Mobile Unit in Idle Mode.

FIG. 6 is a flow chart illustrating operation of the Mobile Unit in Idle Mode. Briefly, Idle Mode includes a sequence of generally repetitive instructions, arranged in an idle loop, in which the Mobile Unit processor polls or is interrupted by special events, and branches to an appropriate Mode.

On power up at block 1100, control passes to block 1102, which determines whether a RINGING signal is present on the Mobile Unit's receiver. Essentially, decision block 1102 determines whether the Control Center is calling the Mobile Unit. If such a RINGING signal is present, control passes to block 1104, at which the Mobile Unit answers the call from the Control Center. Thereafter, control passes to the Alarm Mode, schematically indicated by flow connector 1106. The Alarm Mode operates in a manner as described below, with reference to FIGS. 8A and 8B.

Normally, control passes to FIG. 6 only after an alarm condition has been detected and reported to the Control Center, because the Mobile Unit is then expecting to receive commands from the Control Center. However, the system may enter the sequence of FIG. 8A ((labelled "Alarm Mode") even when there is no alarm condition. For example, if the transceiver happens to be powered on for some reason other than an alarm condition, and the Control Center calls the transceiver, control follows path 1102, 1104, 1106 in the same manner as if the Mobile Unit had reported an alarm condition to the Control Center. The software executed in FIG. 6 is substantially the same, regardless of whether or not there is an alarm condition present, with the exception that decision block 1302 (FIG. 8A, described below) is skipped, and control would pass directly from block 1300 to decision block 1306. However, in most practical embodiments, it is understood that the Control Center generally calls the Mobile Unit only in response to the Mobile Unit's transmission of an alarm condition or request for assistance.

If, in decision block 1102, it is determined that a RINGING signal is not present, control passes to decision block 1110. At this time, the Mobile Unit controller determines if the ignition switch is on or off. If the ignition switch is off, control passes to decision block 1112. In decision block 1112, the Mobile Unit controller determines whether an alarm condition exists, as may be determined via the sensors in the alarm system 370 (FIG. 3). If the system has detected the presence of an alarm condition, control passes to flow connector 1106, so that the system enters the Alarm Mode.

If, however, the ignition is off and no alarm situation has been detected, the Mobile Unit controller checks the "off-hook" switch of the passenger compartment's cellular telephone handset. The Mobile Unit controller determines at decision block 1114 if the handset is off-hook. If the handset is off-hook, control passes to flow connector 1116, so that the system enters Telephone Mode. The system's Telephone Mode is discussed below, with reference to FIG. 9.

If, however, the ignition is off without an alarm condition being present and the handset is on-hook, control returns to the top of FIG. 6, repeating the Idle Mode loop. In particular, control returns to decision block 1102, in which the Mobile Unit controller determines if there is a RINGING signal in the cellular telephone receiver.

Returning to discussion of decision block 1110, if the Mobile Unit controller determines that the ignition is on (indicating that a user may be present), control passes to decision block 1120. At decision block 1120, the Mobile Unit controller determines whether the user has entered a request using the keypad. If the user has entered a request through the keypad, control passes to flow connector 1122, indicating the system enters Assist Mode. Operation of the system in Assist Mode is described below, with reference to FIG. 7.

If, in decision block 1120, the Mobile Unit controller determines that the user has not entered a request through the keypad, control passes to decision block 1124. At decision block 1124, the Mobile Unit controller determines whether the handset is off-hook. If the handset is off-hook, control passes to flow connector 1116 so that the system enters Telephone Mode as described with reference to FIG. 9. If, however, the Mobile Unit controller determines that the handset is on-hook, control returns to the top of the loop, decision block 1102 which determines if a RINGING signal is present.

In this manner, the Mobile Unit controller repeatedly executes the loop illustrated in FIG. 6, entering the Alarm Mode, Telephone Mode, or Assist Mode, as appropriate.

Figure 7:
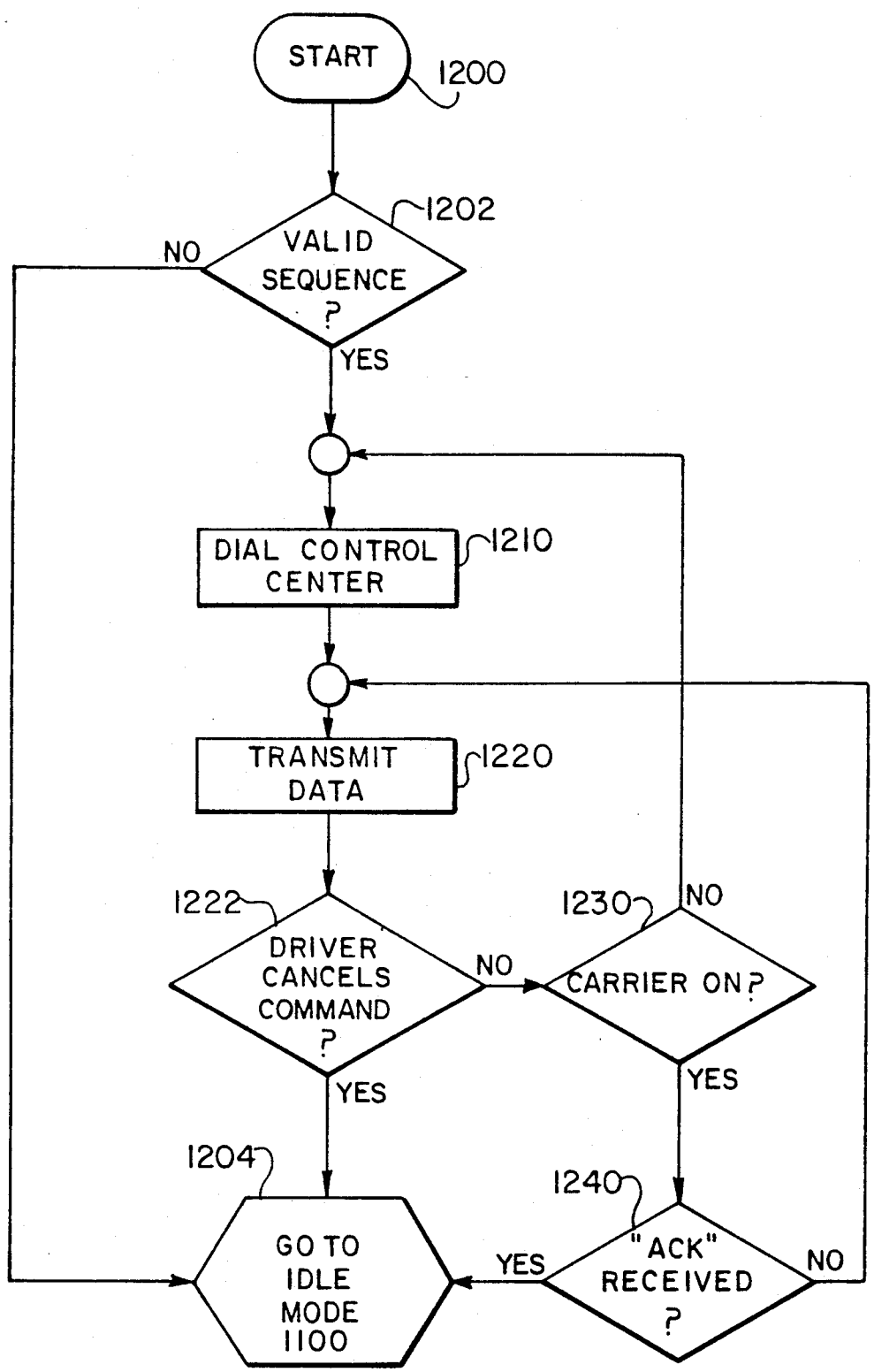
FIG. 7 is a flow chart of the operation of the preferred Mobile Unit in Assist Mode.

Referring now to FIG. 7, operation of the Mobile Unit controller in Assist Mode is illustrated. Briefly, FIG. 7 shows the manner in which a user's request for assistance, entered through the keypad, is processed by the Mobile Unit and transmitted to the Control Center.

After entering Assist Mode at block 1200, control passes to decision block 1202. At decision block 1202, the Mobile Unit controller determines whether the sequence of key entries from the keypad is a valid sequence. For example, in order to call the police, the driver must hit the ASSIST, POLICE and SEND keys, in exactly that order. If the order is not one of a number of valid predetermined sequences, control passes to block 1204, indicating a return to the Idle Mode (FIG. 6). This path is followed, for example, if a child playing in the car hits random keys, so that the Control Center is not called in this case.

If the keypad key sequence is valid, control passes to block 1210. At block 1210, the Mobile Unit controller causes the cellular or other appropriate transmitter to dial the Control Center After checking to see whether there is a good connection to the Control Center, the Mobile Unit controller transmits the appropriate data to the Control Center, as indicated at block 1220. The data which is transmitted may include a request for a wrecker, police assistance, an ambulance, or a fire truck, along with automatically included GPS-derived position information Decision block 1222 is illustrated at the output of transmit data block 1220, to illustrate that the vehicle driver or occupant may cancel the command at any time with a predetermined key sequence. In this case, the CANCEL command interrupts the Mobile Unit controller's processor, causing control to pass to block 1204 to return to Idle Mode. However, in the normal event in which no CANCEL command is received, control passes to decision block 1230.

Essentially, decision block 1230 determines whether the communications link to the Control Center is established. In the preferred embodiment, this is done by checking for the presence of a carrier signal from the Control Center. If the Mobile Unit controller determines that there is no carrier present, the Mobile Unit controller causes the Control Center to be re-dialed at block 1210. In the normal circumstance, however, the carrier will continue to be on, and control passes to decision block 1240.

At decision block 1240, the Mobile Unit controller determines whether an ACK has been received from the Control Center. As appreciated by those skilled in the art, the ACK is an "acknowledge" signal, by which the Control Center may indicate that the vehicle driver's keypad assistance request has been received at the Control Center. If the ACK signal has been received, control passes to block 1204 to indicate re-entry into the Idle Mode. If, however, an ACK signal has not been received, control passes to block 1220, in which the data is re-transmitted.

Figure 8A:
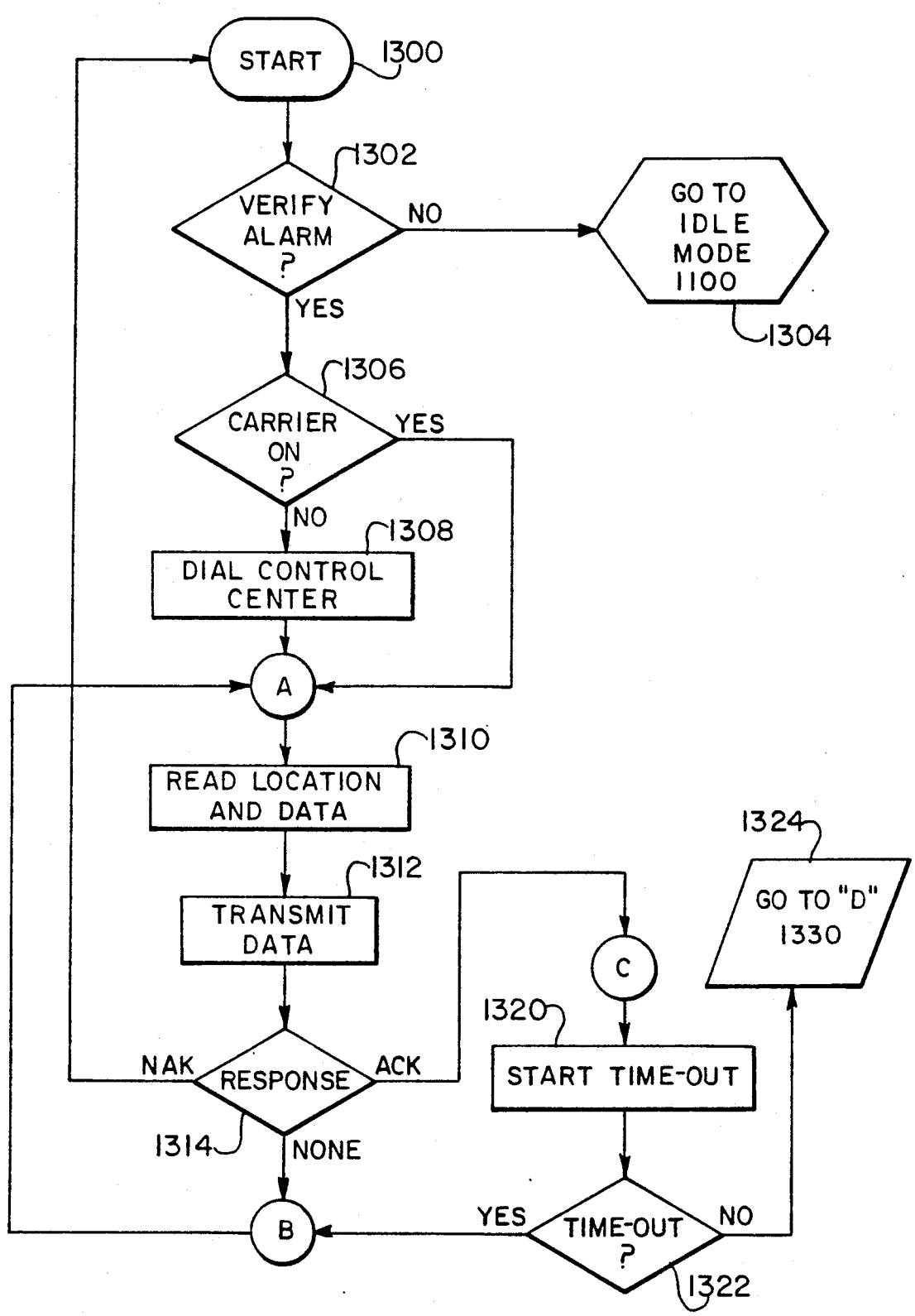
FIGS. 8A and 8B are flow charts illustrating operation of the preferred Mobile Unit in Alarm Mode.
Figure 8B:
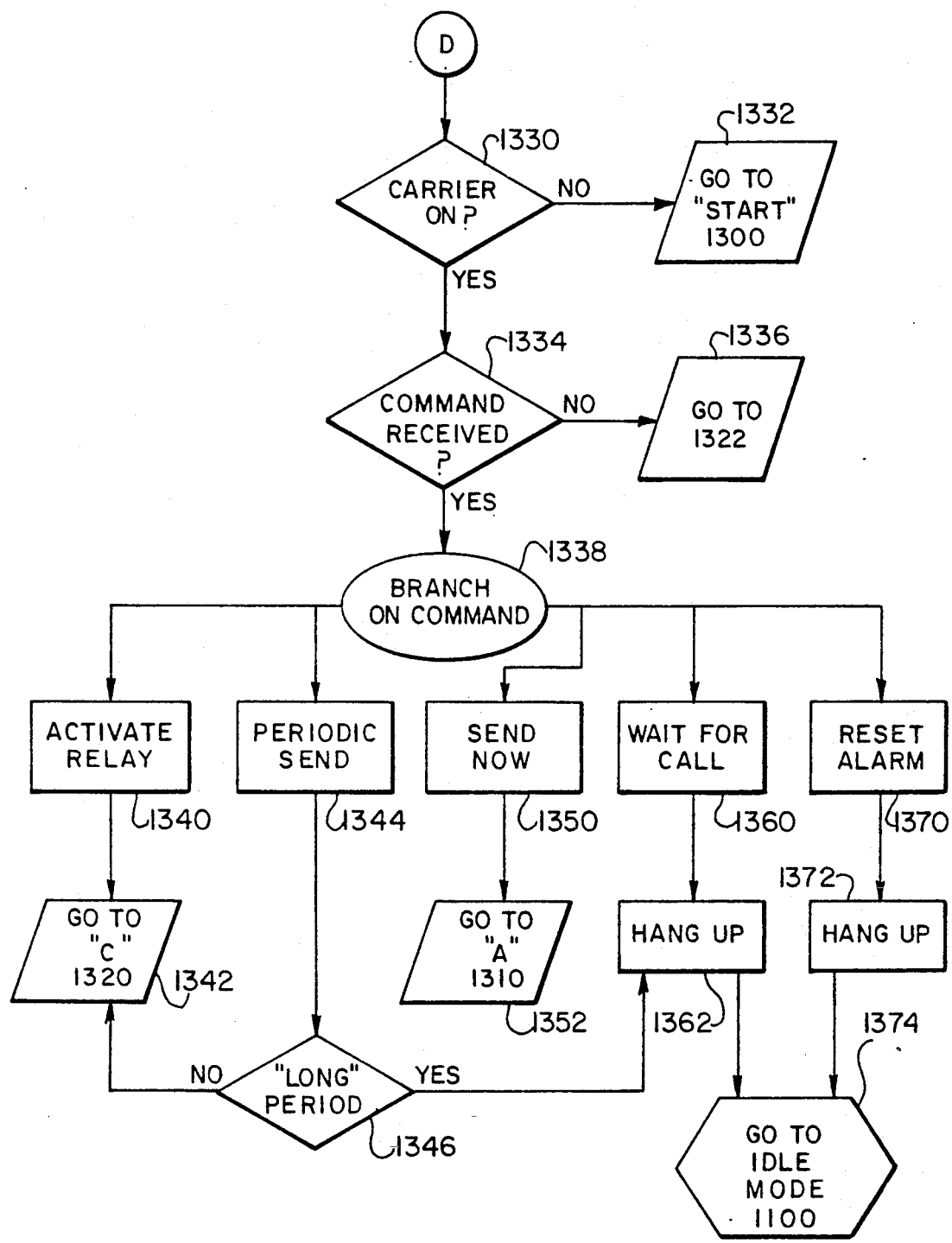

Referring now to FIGS. 8A and 8B, operation of the Mobile Unit in the Alarm Mode is illustrated in flow chart form. The Alarm Mode is entered when some condition, perhaps indicative of a car theft or mechanical malfunction, is detected by the Mobile Unit. Thus, FIGS. 8A and 8B illustrate the manner in which the Mobile Unit detects an alarm condition, verifies its presence, attempts to transmit data relating to the alarm condition to the Control Center, listens to the communication link from the Control Center for possible commands as to how to respond to the alarm condition, and executes the commands.

Upon entry into the Alarm Mode at block 1300, control passes to a decision block 1302. At decision block 1302, the Mobile Unit controller verifies the presence of an alarm condition. If the alarm condition has disappeared in the time since the Alarm Mode routine was called, control passes to block 1304, indicating re-entry into the Idle Mode without further processing.

If, however, the Alarm Mode is confirmed decision block 1302, control passes to decision block 1306. Decision block 1306 represents the Mobile Unit controller's determination of whether a carrier is present on the communications link from the Control Center. Normally, on the first pass through the illustrated software loop, a carrier will not be on, and control will pass to block 1308. In block 1308, the Mobile Unit controller causes the transmitter to dial the Control Center. On any subsequent passes through the illustrated Alarm Mode routine, a carrier will normally have been established, so that control will by-pass block 1308. In either event, control eventually passes to block 1310.

Block 1310 indicates a reading of location, velocity, time and other data which is stored in memory in the Mobile Unit controller. In particular, the preferred data is that which is derived using the Global Positioning System receiver 314 (FIGS. 2, 3). Other data which is read includes the condition of the GPS board (as to whether it is locked up).

In embodiments in which an auxiliary position determination unit 390 (FIG. 2) is provided, block 1310 is understood to include the microcomputer's interrogation of the auxiliary positioning determination unit 390 when necessary or desirable. That is, if the GPS unit is inoperative, or the vehicle is in a location out of range of a sufficient number of GPS satellites, or the GPS receiver is receiving data of a quality which does not allow meaningful position or velocity determinations to be made, the microcomputer may seek additional location, time, and direction information.

After this position, velocity and time data is read, control passes to block 1312 in which the Mobile Unit transmits the data to the Control Center. The Mobile Unit waits for a response from the Control Center. When a response is received, control passes to decision block 1314.

At decision block 1314, the Mobile Unit controller branches, based on the receipt of an ACK acknowledge signal, a NAK (not acknowledge) signal, or neither the ACK nor NAK signal after a first time-out period. If a NAK signal is received from the Control Center, indicating a transmission error, control returns to the beginning of the Alarm Mode loop, block 1300. If neither a NAK nor an ACK signal is received, control passes to block 1310, in which the location and timing data are read for re-transmission at block 1312. If it is a normal case, an ACK signal is received and control passes to block 1320.

At block 1320, a second time-out period (preferably about 30 seconds) is begun. If the time-out has expired as tested by decision block 1322, control passes back to block 1310 for reading the location and timing data for re-transmission. If, however, the second time-out period has not elapsed, control passes to FIG. 8B.

FIG. 8B is entered when an acknowledge has been received and the second time-out period has not expired. That is, this portion of the flow chart is entered so as to wait for a possible command from the Control Center.

At decision block 1330, the Mobile Unit determines whether the carrier from the Control Center is on. If the carrier is no longer on, control passes to block 1332 indicating a return to the beginning of the Alarm Mode routine at block 1300 (FIG. 8A). If, however, the normal situation is followed in which the carrier is still on, control passes to decision block 1334. At block 1334, the Mobile Unit controller determines whether a command has been received from the Control Center. If a command has not been received from the Control Center, control passes to block 1322, indicating that the system should continue to check for expiration of the second time-out period.

If a command has been received from the Control Center, the Mobile Unit controller branches to one of several routines based on the particular command, indicated by "branch on command" block 1338.

If the Control Center command was to take control of the vehicle in some way, such as by activating a relay to disable the vehicle, blink its lights, or sound its alarm horn, control passes to block 1340. Block 1340 is a generalized representation of the possible control actions which the Control Center may exert upon the vehicle. Thus, according to the present invention, the Control Center is not merely a passive observer of the vehicle, but may remotely control aspects of its operation.

After the activity has been completed in block 1340, control passes to block 1342, indicating return to the start time-out block 1320 to await possible further commands from the Control Center.

If the Control Center has sent a PERIODIC SEND command to the Mobile Unit, control passes to block 1344. Briefly, the PERIODIC SEND command instructs the Mobile Unit to send its position and time data periodically. This PERIODIC SEND command is especially useful when a stolen vehicle is being moved and the police wish to track its course. By periodically sending its location, the Mobile Unit allows the police to keep updated as to its location leading them to the thief, and possibly to a location where stolen cars are disassembled for illegal sale of their parts.

Control passes to decision block 1346, which determines whether the "period" of the PERIODIC SEND command is deemed to be a "long" period or a "short" period. A short period may be instructed, for example, when a car has recently been stolen, and the police wish to track it closely. A long time period between transmission of location data may be more appropriate in longdistance trucking companies, when no foul play is suspected, but general tracking of vehicles in a fleet is desired.

If the Control Center has commanded the Mobile Unit to transmit its location infrequently (for example, once every three hours), control passes to hang-up block 1362, after which the system returns to Idle Mode. If, however, the period instructed by the Control Center is a short period (for example, less than two minutes), control returns to start time-out block 1320, to await possible further commands.

In any event, after exiting this loop, the Mobile Unit has been instructed to periodically send its data to the Control Center, and will do so until commanded otherwise.

If the Control Center has sent a SEND NOW command, control passes to block 1350. The Mobile Unit transmits its data immediately. Thereafter, control passes back to block 1310, where the location and timing data are read for transmission at block 1312.

If the Control Center has sent a WAIT FOR CALL command, control passes to block 1360. The Mobile Unit then hangs up, indicated by 1362, and enters Idle Mode (FIG. 6), indicated at block 1374. Briefly, the WAIT FOR CALL command sets a Mobile Unit flag indicating that the Control Center will call the Mobile Unit back in the future, even though the Mobile Unit has presently hung up. In response to this command, the Mobile Unit hangs up, but retains power to the transceiver and GPS even if the car is turned off. Normally, if the car ignition is turned off, the transceiver and GPS receiver would be powered down, so as to conserve power. However, when the Control Center wishes to transmit a message to the Mobile Unit at some indefinite time in the fairly near future but realizes the message must be received by the Mobile Unit, this WAIT FOR CALL command is sent, allowing at least some power to be saved.

If the Control Center has sent a RESET ALARM command, control passes to block 1370. At block 1370, the Mobile Unit resets the alarm condition, and hangs up as indicated at block 1372. This command essentially causes the Mobile Unit to verify that an alarm condition truly exists, and that it is not a "false alarm". If an alarm condition still exists, the Mobile Unit must go through the entire process of detecting an alarm condition, and sending notification thereof to the Control Center to verify that an alarm condition indeed has occurred.

Figure 9:
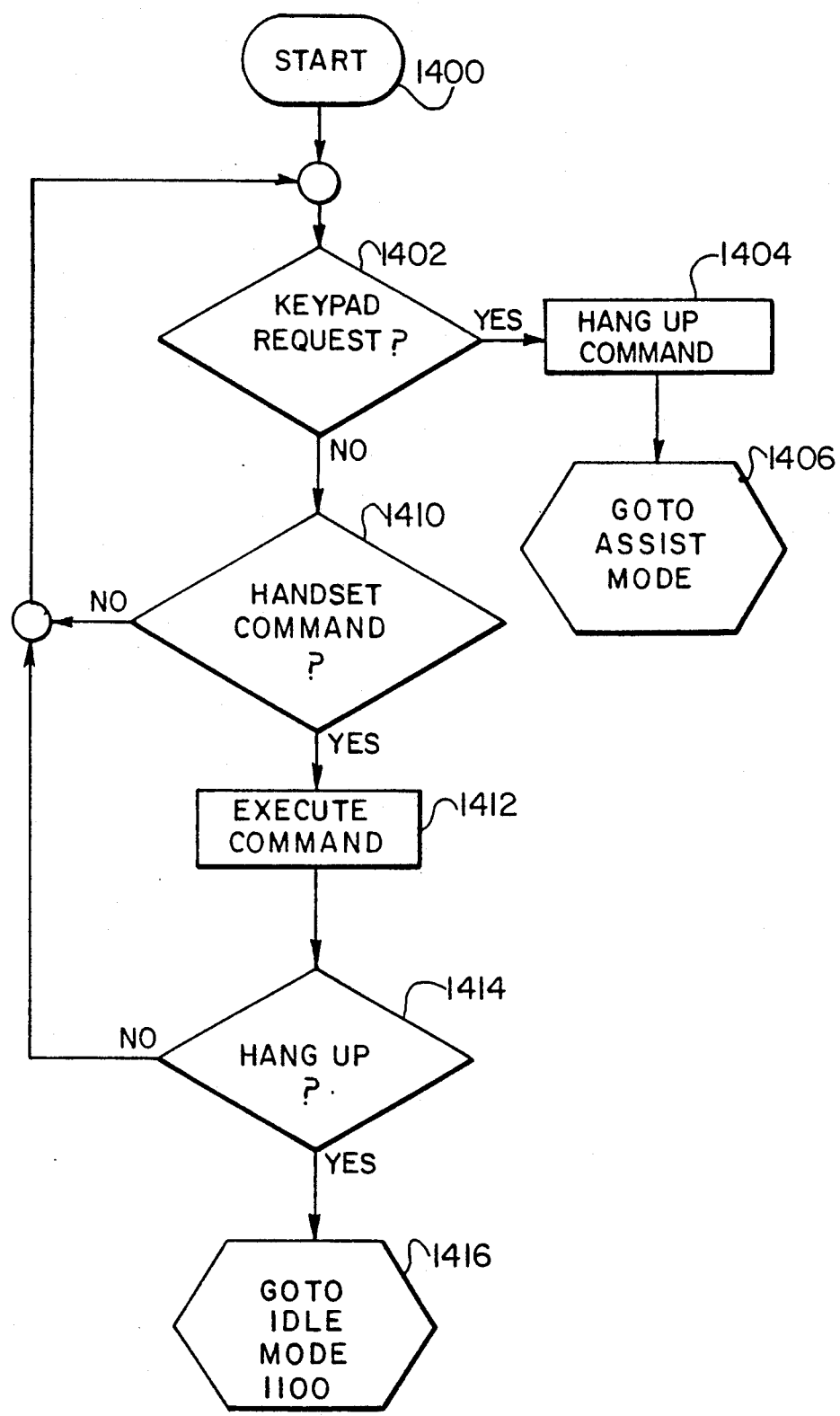
FIG. 9 is a flow chart illustrating operation of the preferred Mobile Unit in Telephone Mode.

FIG. 9 illustrates operation of the Mobile Unit in the Telephone Mode. The Telephone Mode is provided in only some embodiments of the present invention. The Telephone Mode is provided for the convenience of the vehicle operator, allowing him to use a cellular telephone handset which is in the vehicle's passenger compartment. This convenience feature allows the driver to use the cellular transceiver for voice communications to any desired destination, the transceiver otherwise being used only for keypad monitoring and automatic vehicle monitoring purposes.

The system treats the keypad as having a higher priority than the passenger compartment handset. Thus, the Telephone Mode processing is completed when the handset is polled, the handset not being capable of interrupting the Mobile Unit controller's processor due to its lower priority.

Upon entering the Telephone Mode at block 1400, control passes to decision block 1402. At decision block 1402, the Mobile Unit controller determines whether a keypad request has been entered. If a keypad request has been entered, indicating a higher-priority communication than voice communications using the handset, control passes to block 1404 at which the Mobile Unit controller causes the transceiver to hang up. Immediately thereafter, control passes to block 1406, to enter the Assist Mode to process the sequence of keypad key entries. If, however, the Mobile Unit controller determines at decision block 1402 that there has been no keypad request, control passes to decision block 1410.

To understand decision block 1410, it must first be understood that the handset has a digital microprocessor, the handset digital microprocessor having an interface with a transceiver microprocessor. Thus, the handset does not merely provide voice information; it communicates using digital handset commands to the transceiver. Thus, when decision block 1410 is entered, the presence or absence of a handset command is determined. Typical handset commands might be to dial a number, re-dial a last number dialed, display the local mobile telephone number, and so forth. Generally, however, it is understood that these digital handset commands are expected to govern a voice channel communication carried on through the handset. These handset data commands are distinct from keypad commands.

If no handset command has been entered, control returns to decision block 1402, to check whether a keypad request has been entered. If, however, a handset command has been entered, control passes to block 1412, indicating execution of the handset command.

After the handset command has been executed, control passes to decision block 1414. At block 1414, the Mobile Unit controller determines whether the handset has been hung up. If the handset has not been hung up, control returns to decision block 1402 for determination of whether a keypad request has been entered. If, however, the handset has been hung up, control passes to block 1416, indicating return to the Idle Mode (FIG. 6).

In order to maintain complete surveillance of the vehicle, the Mobile Unit is always "on"—to the extent needed to monitor the alarm inputs. For example, the microcomputer, keypad, trunk sensor, hood sensor, and motion sensor, as well as the alarm system itself, are preferably kept powered constantly. However, the GPS receiver, handset, and transceiver are preferably powered down when the vehicle operator turns the ignition switch off, so as to conserve power.

Figure 10A:
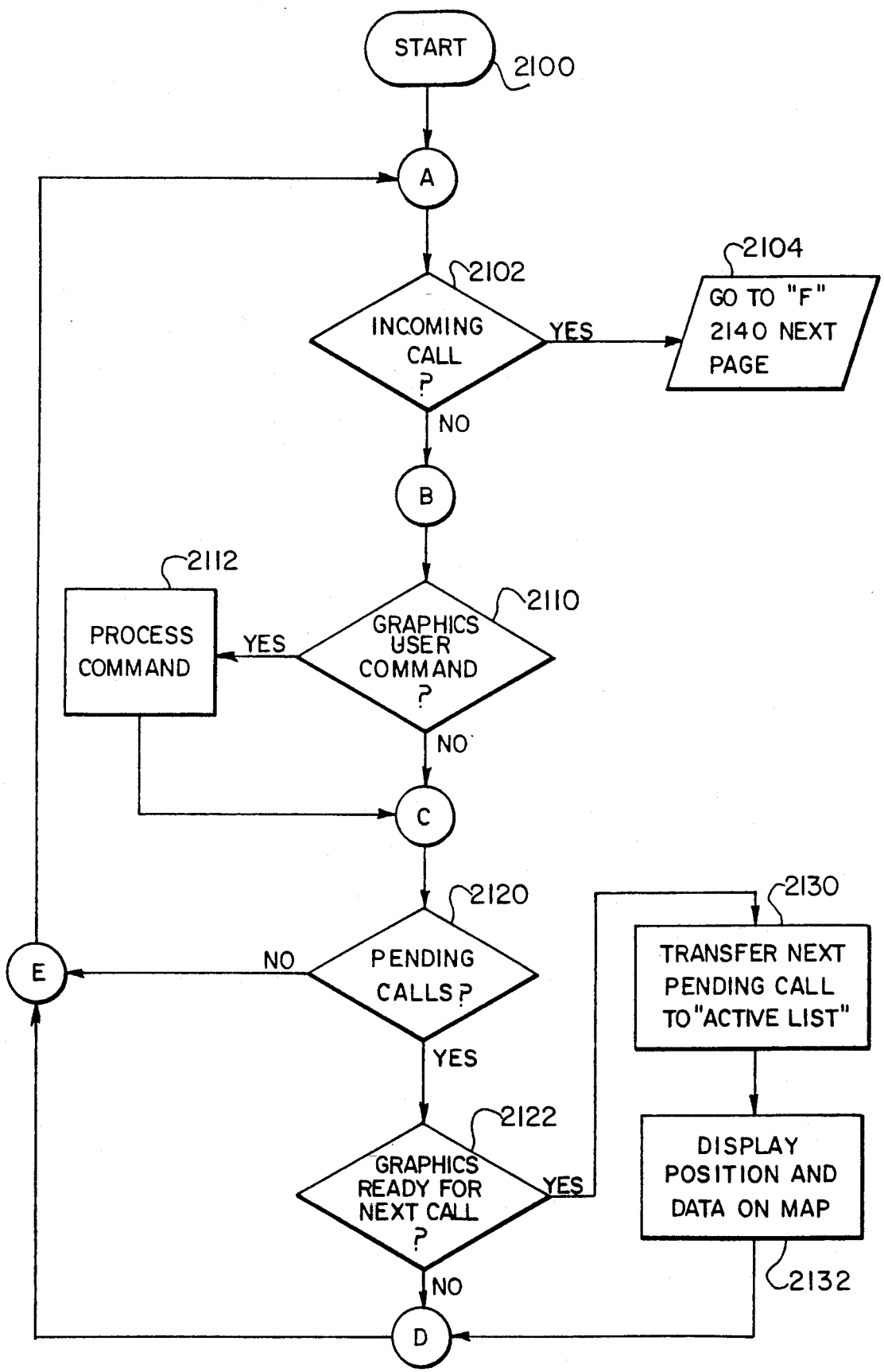
FIGS. 10A and 10B are flow charts illustrating operation of the preferred Control Center.
Figure 10B:
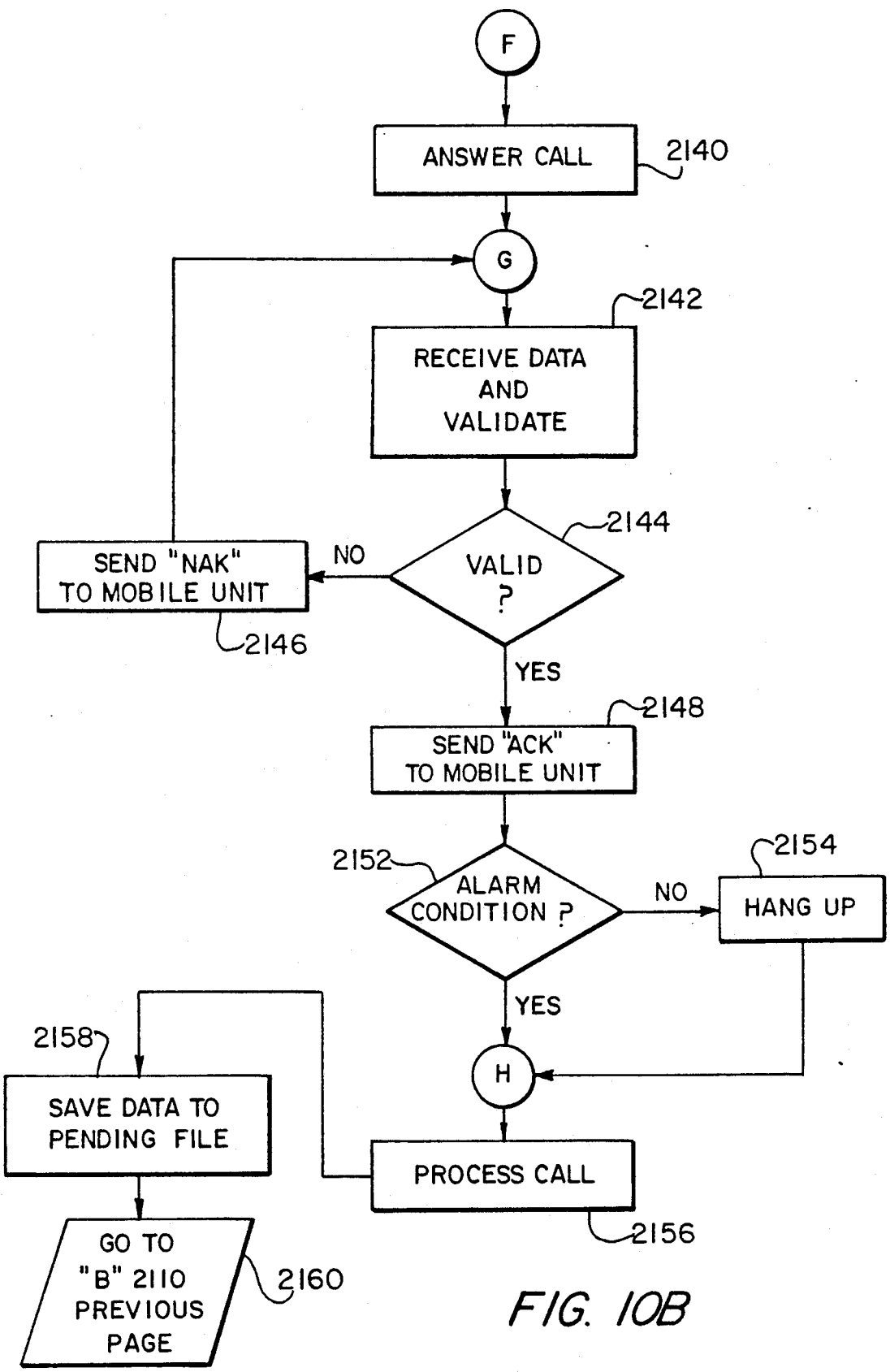

Referring now to FIGS. 10A and 10B, operation of the Control Center software is illustrated in a flow chart. At the outset, it must be understood that the preferred Control Center involves two controllers including respective computers. The first controller is a communications controller, which may have a slower-speed processor such as an INTEL 80286. The second controller is a display controller, which requires a higher-speed microprocessor for graphics processing, such as an INTEL 80486 or equivalent. The functional blocks illustrated in FIGS. 10A and 10B are executed by the communications controller processor, except where specifically noted.

Execution begins at block 2100, after which control passes to decision block 2102. At decision block 2102, the communications controller determines whether there are any incoming calls from vehicles. In a preferred embodiment, the communications controller polls eight ports including RS-232 boards. Data received over the cellular telephone line is passed to the communications controller processor through the RS- 232 boards, the preferred data transmission format being FSK (Frequency Shift Keying) modulation at 300 baud. If the communications controller determines that there is an incoming call, control passes to FIG. 10B to answer the call.

FIG. 10B is a routine which is executed or not executed between blocks 2102 and 2110, depending on whether a new incoming call has been received. The remainder of FIG. 10A relates to the manner in which the communications controller provides information to the display controller, buffering that information if necessary.

If the communications controller determines that no new incoming call is being received, control passes to decision block 2110. At decision block 2110, the communications controller determines whether the Control Center operator has entered a command on the display controller console. This determination is made by polling the communications line from the display controller to the communications controller If a command has been received, control passes to block 2112. At block 2112, the communications controller processes the command which has been entered through the display controller input console. After the command has been processed, control passes to decision block 2120. If the communications controller determines that the Control Center operator has entered no command through the display controller, control passes directly to decision block 2120 without processing any command.

Decision block 2120 represents the communications controller's determination of whether there are any "pending" calls. To appreciate the meaning of a "pending" call, it must be understood that the display controller is often occupied with processing-intensive tasks such as graphics processing and display, it cannot readily respond to the potentially large number of erratically timed calls from a large number of vehicles. To solve this problem, the communications controller acts as a buffer between the communication input ports and the display controller, keeping track of any calls which have already been received but not yet sent to the display controller. The communications controller records those calls in a "Pending Call" table preferably stored in CPU memory and backed up on disk.

If the communications controller determines that there are no pending calls in the Pending Call Table, control returns to decision block 2102 where the communications controller again determines whether there are any more incoming calls.

If the communications controller determines that there are pending calls in the Pending Call Table, control passes to decision block 2122. At decision block 2122, the communications controller determines whether the display controller is ready to receive and process information regarding the next call in the Pending Call Table. Essentially, the communications controller interrogates the display controller to determine whether the display controller is ready to receive additional data.

If the display controller is not ready to receive new data regarding the next pending call, control passes to decision block 2102, so that the communications controller can listen for an additional incoming calls from the vehicles.

If, however, the communications controller learns from the display controller that the display controller can receive new data, control passes to block 2130. In block 2130, the communications controller transfers data about the next pending call to a "Active List" which is maintained in the display controller. Essentially, the Active List is a list of vehicles which have called in and are presently displayed or otherwise considered by the Control Center operator, and have not yet been cleared from the system by the Control Center operator. Thus, the Active List is essentially a list of vehicles which are presently of interest to the Control Center operator.

After the most recent pending call has been added to the Active List, control passes to block 2132. Data relating to the position and status of the vehicle causing the pending call is displayed on one or more of the display controller's display screens. At this time, the pending call has thus been brought to the attention of the Control Center operator. Control then returns to decision block 2102, at which the communications controller polls the communications input ports for additional incoming calls.

Referring now to FIG. 10B, the flow of operations for initially handling a new incoming call, is illustrated. When a new incoming call is detected, control passes to block 2140. At block 2140, the call is answered by the communications controller.

Then, control passes to block 2142. In block 2142, the communications controller receives the data and determines whether the data is valid. Essentially, the validation process is a low-level integrity check of data which has been received over the cellular telephone or other communications link. For example, communications channel errors may be detected through use of parity checks o detecting invalid characters. Recovery from errors may include isolating invalid words. Thus, the validation may include any of a variety of other error detection and correction schemes known to those skilled in the art.

After data validation, control passes to decision block 2144. At block 2144 the communications controller determines whether the received data, after any error correction, is valid. If the data is not valid, the communications controller causes a NAK to be sent to the Mobile Unit. The Mobile Unit responds to the NAK in a manner described above, with reference to FIGS. 7, 8A, and 8B.

If the communications controller determines that the received data is valid (or was sufficiently corrected in block 2142 by an error correction scheme), control passes to block 2148. At block 2148, the communications controller sends an ACK to the Mobile Unit. The Mobile Unit responds to the ACK signal in a manner described above, with reference to FIGS. 7, 8A, and 8B.

After the ACK signal has been sent, the communications controller determines whether an alarm condition exists at block 2152. If an alarm condition exists, an alarm flag is set in the communications controller software. Decision block 2152 branches, based on the state of the alarm flag. If there is no alarm condition, control passes to block 2154, so that the Control Center hangs up its end of the communications link to the vehicle. After hanging up, the communications controller goes on to block 2156 to process the call. However, if an alarm condition is found to exist, control passes directly to block 2156, without hanging up the communications link to the vehicle.

Essentially, block 2156 is a general indication of how the ASCII information transmitted through the cellular telephone link is converted to a suitable form, such as Binary Coded Decimal (BCD). Control then passes to block 2158.

In block 2158, the communications controller saves the reformatted data in the Pending Call table, which was described above with reference to block 2120. Thereafter, control returns to FIG. 10A, decision block 2110, to continue with the communications controller main loop.

Although, in the illustrated embodiment, the communications controller function is provided by a different processor than the display controller function, it lies within the contemplation of the invention that both functions may be executed by a single processor of suitably high speed and processing capability. A feature of the preferred Control Center is to be able to receive erratically timed incoming calls from a variety of vehicles, and present them on visual displays to the Control Center operator while simultaneously responding appropriately to the vehicles. Thus, although the preferred embodiment bifurcates the communications control function and the display control function, it is understood that the scope of the invention should not be limited to this particular implementation.

FIGS. 11-17 illustrate exemplary screen displays for the communications display 174 and mapping displays 182 (FIG. 1). In a preferred embodiment, mapping display 182A displays a general area coverage map showing a relatively large area, such as the 14 counties around the Dallas/Fort Worth metroplex area. Mapping displays 182B, 182C, and 182D may be used to display vehicle locations for both stolen vehicle calls and motorist assistance calls, on much smaller-area maps. Plural mapping displays 182B, 182C, 182D... are illustrated, so as to demonstrate the ability of the invention to simultaneously display many different incoming calls. The following discussion refers to only one mapping display at a time, but it is understood that more than one call can be processed and displayed concurrently.

Figure 11:
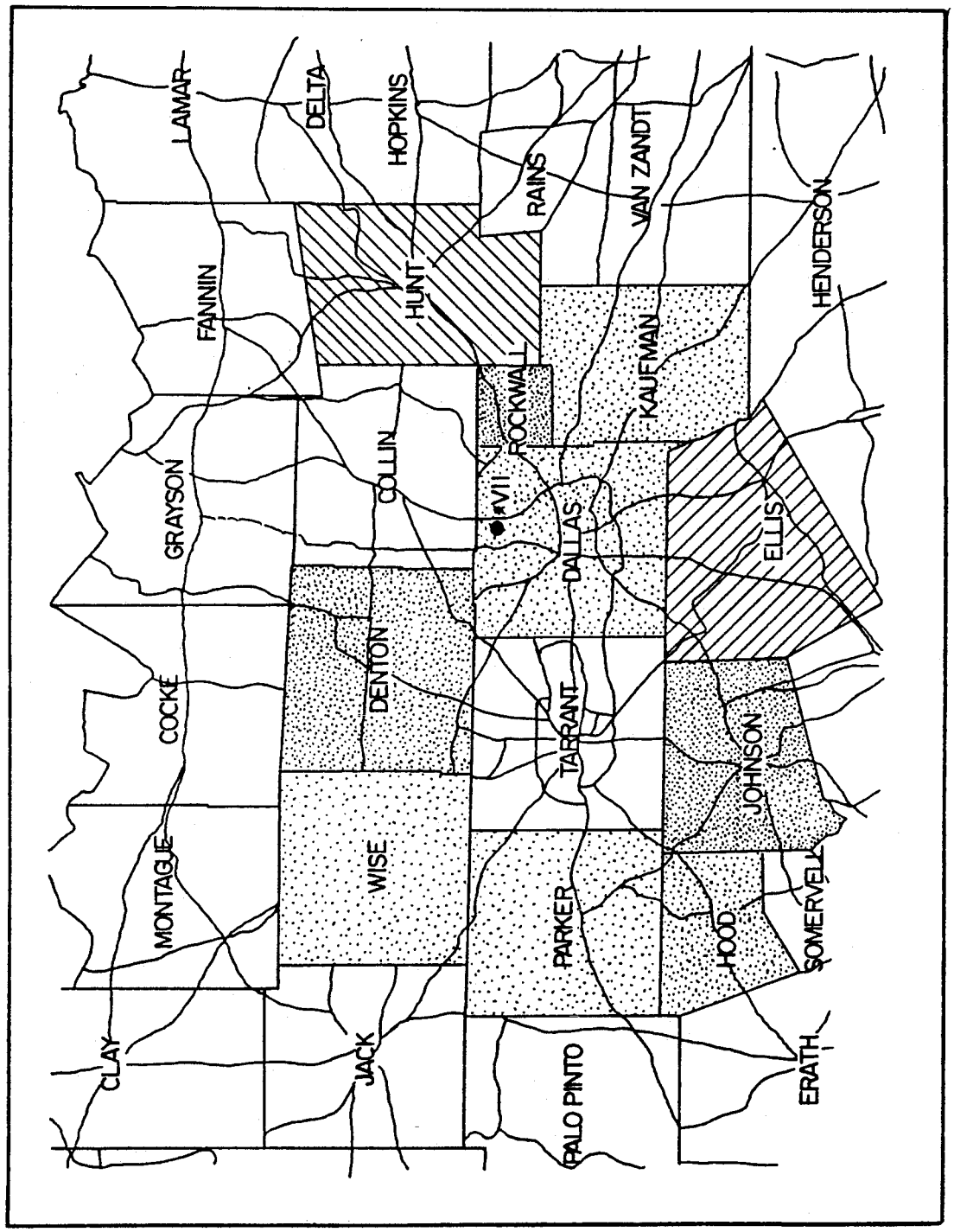
FIG. 11 illustrates an exemplary "General Area Coverage Map" as it might be displayed to a Control Center operator.

Upon starting the communications controller 170 and display controller 180, a standard booting and log-on procedure may first be executed. A general area map is first displayed on mapping display 182A. A typical general area coverage map is shown in FIG. 11. Upon the display of this general area map, the system is in "Ready for Call". Processing may begin with the next incoming call.

Figure 12:
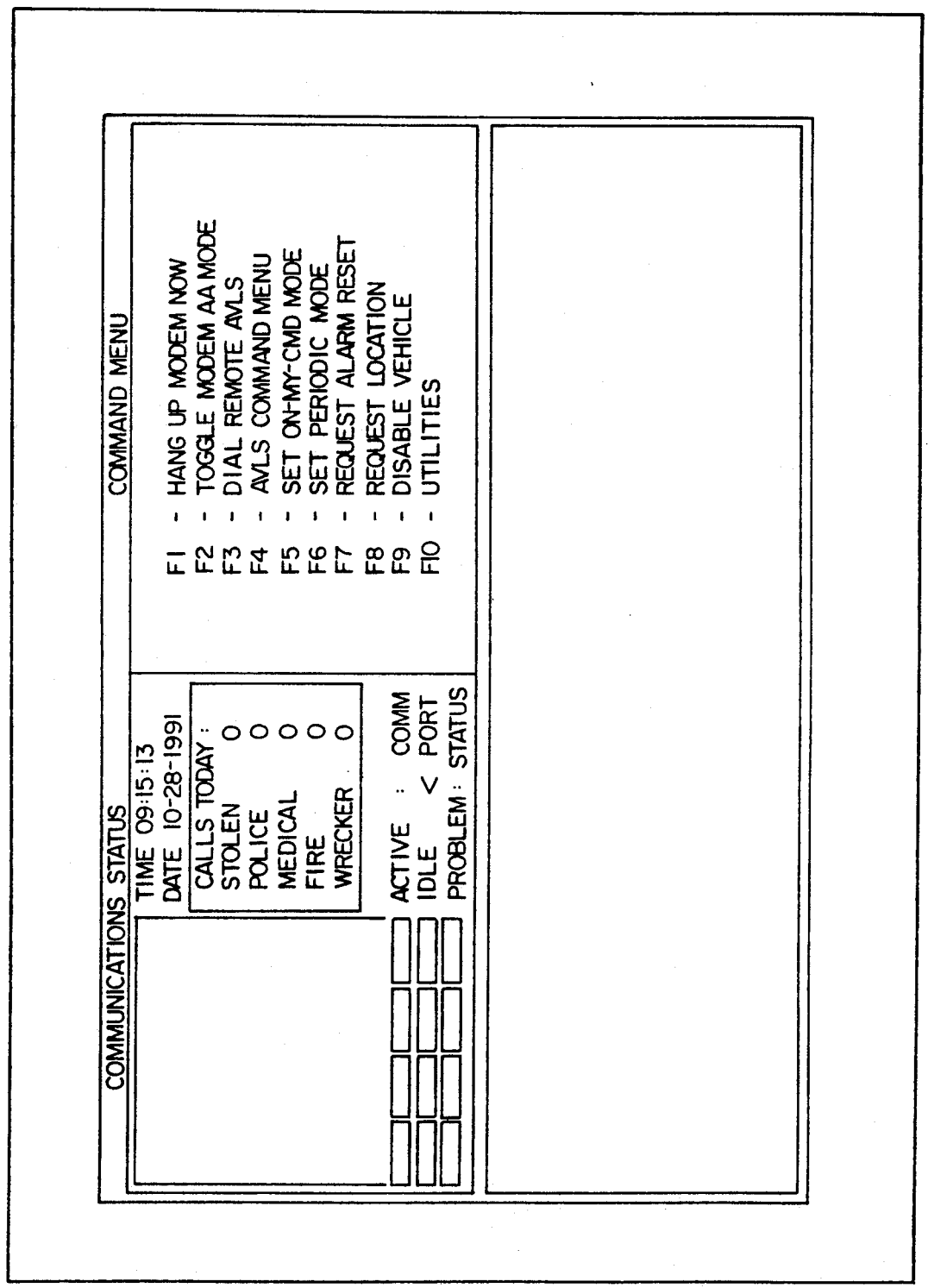
FIG. 12 illustrates an exemplary COMMAND MENU for the preferred communications controller in the Control Center.

Meanwhile, the communications display shows its high-level menu, illustrated in FIG. 12.

Figure 13:
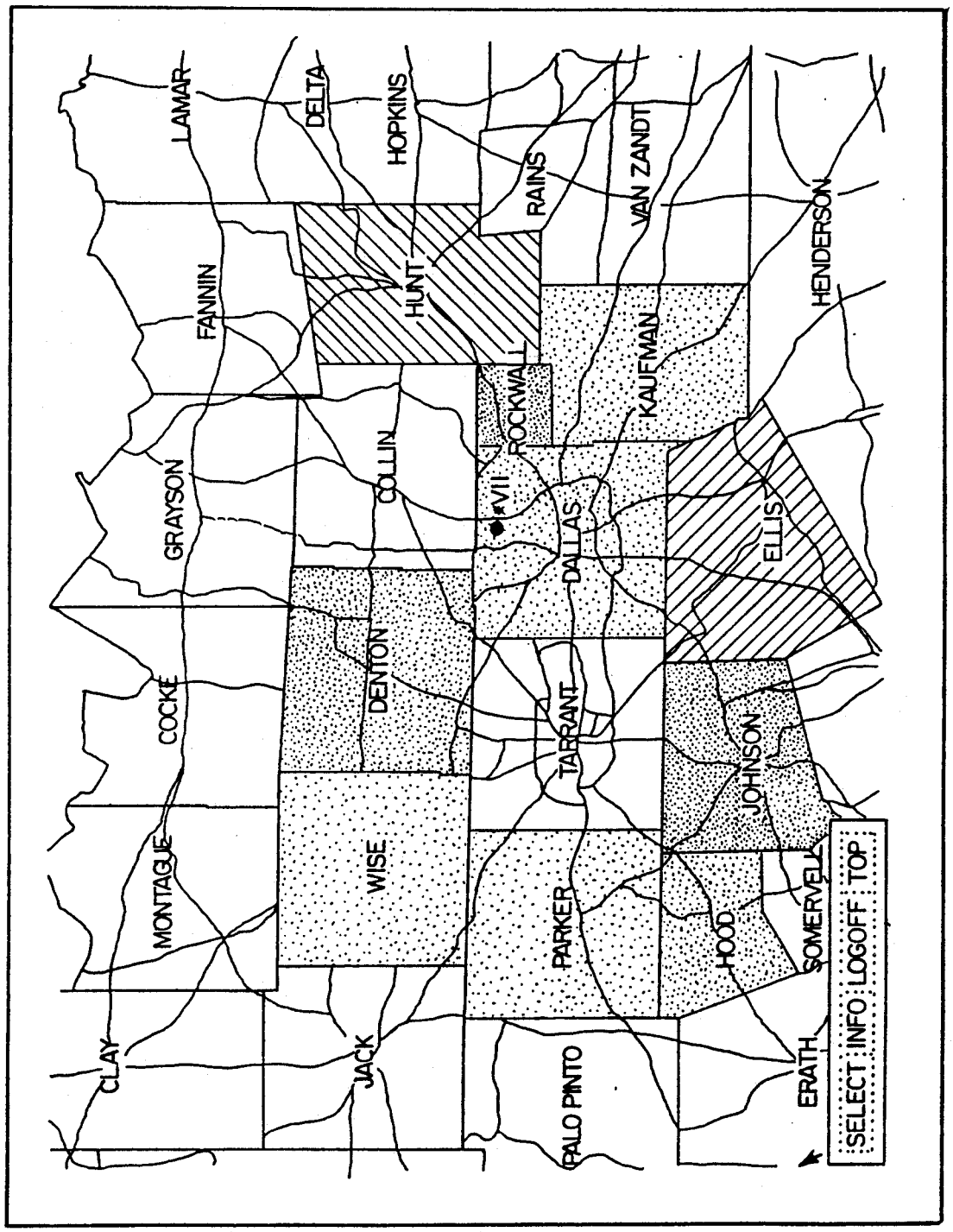
FIG. 13 illustrates an exemplary display controller CONTROL MENU superimposed on a map, as displayed to the Control Center operator.

FIG. 13 shows the General Area Coverage Map of FIG. 11, but with a menu in its lower left corner. The menu in the lower left corner of FIG. 13 allows the Control Center operator to display information related to vehicles and emergency service providers on the other mapping displays. The "TOP" menu entry merely allows the operator to move the menu to the top of the screen. The "LOG OFF" menu entry allows the user to end a session, before a relief operator begins his shift. The "INFO" and "SELECT" entries allows the system to provide crucial information to the Control Center operator.

Figure 14:
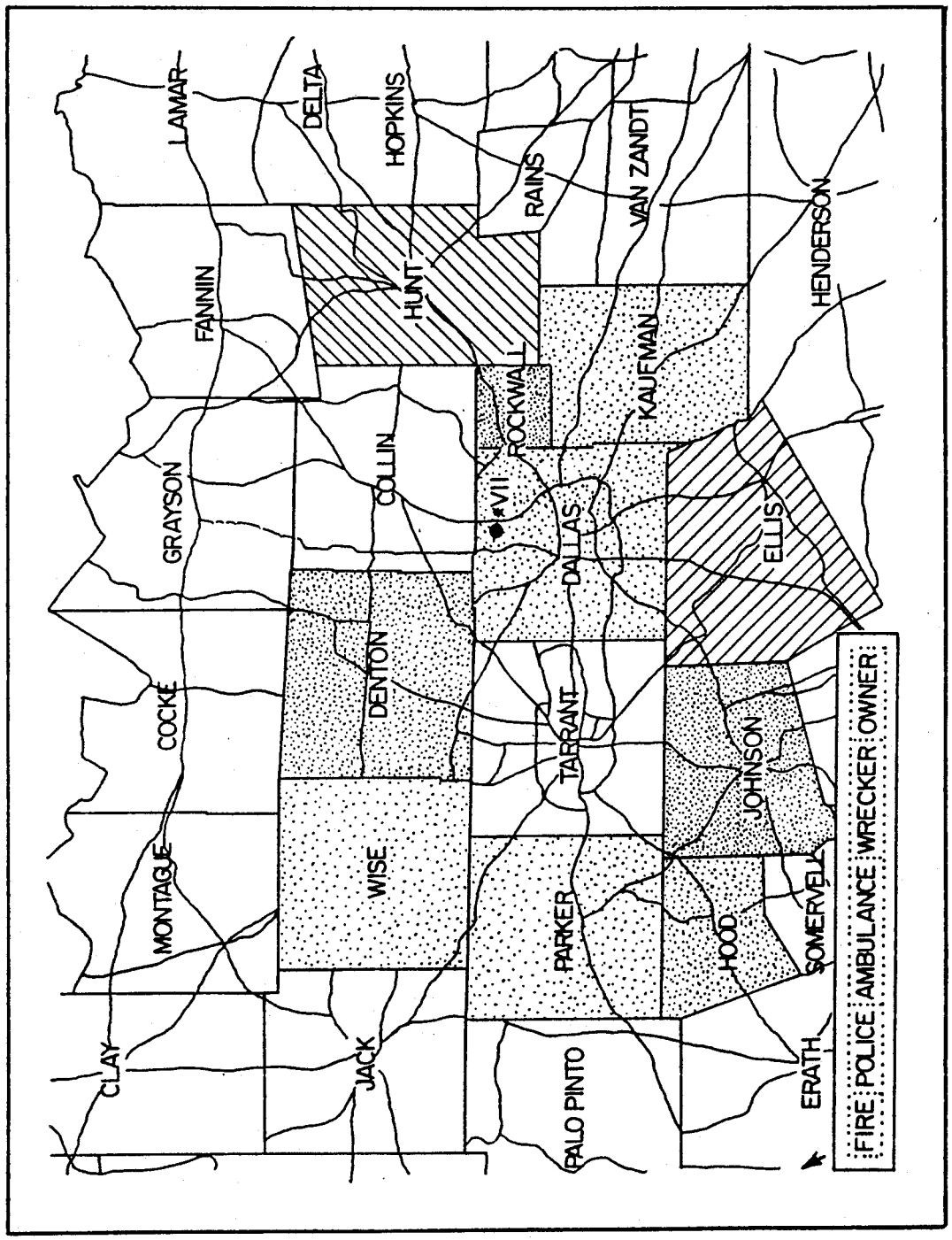
FIG. 14 illustrates an exemplary MOTORIST ASSISTANCE SERVICES menu superimposed on a map, as displayed to the Control Center operator after being accessed from the CONTROL MENU of FIG. 13.

The "INFO" menu selection causes display of a MOTORIST ASSISTANCE SERVICE menu such as that illustrated in FIG. 14. In FIG. 14, a menu allows the operator to select a service, such as the fire department, police, ambulance service, or a wrecker. When the Control Center operator selects a particular service, all stations capable of providing that service are displayed on the general area coverage map. A "cross hair" appears on the screen, allowing the operator to select any one of the stations (such as a fire station or police station). Upon selection using a mouse or other suitable input device, a "window" appears on the MOTORIST ASSISTANCE SERVICE menu, including information on the address, phone number, and other useful information about the particular fire station. This information allows the Control Center operator to contact the fire station by telephone or other conventional means.

Figure 15:
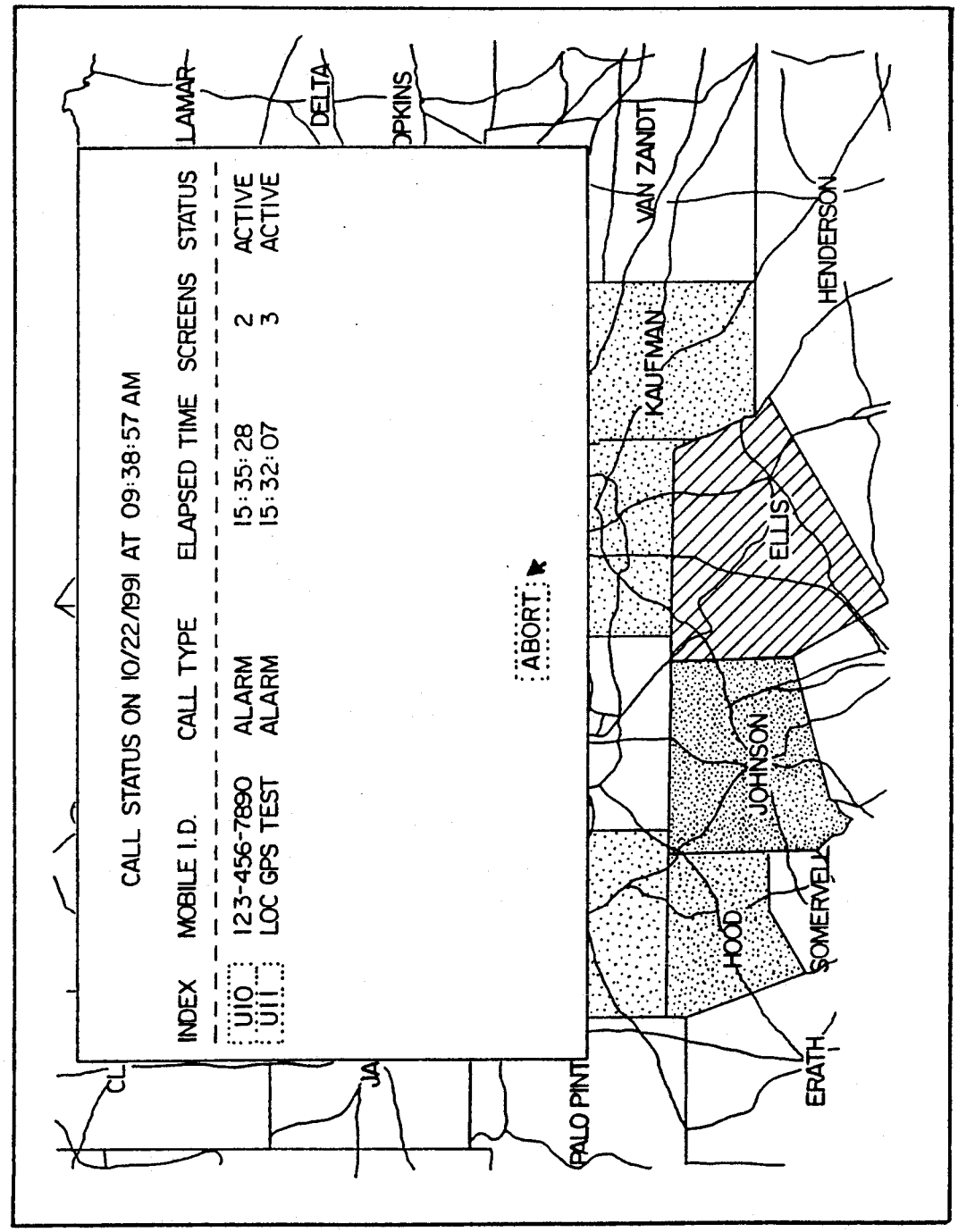
FIG. 15 illustrates an exemplary CALL STATUS menu superimposed on a map, as displayed to the Control Center operator after being accessed via the CONTROL MENU of FIG. 13.
Figure 16:
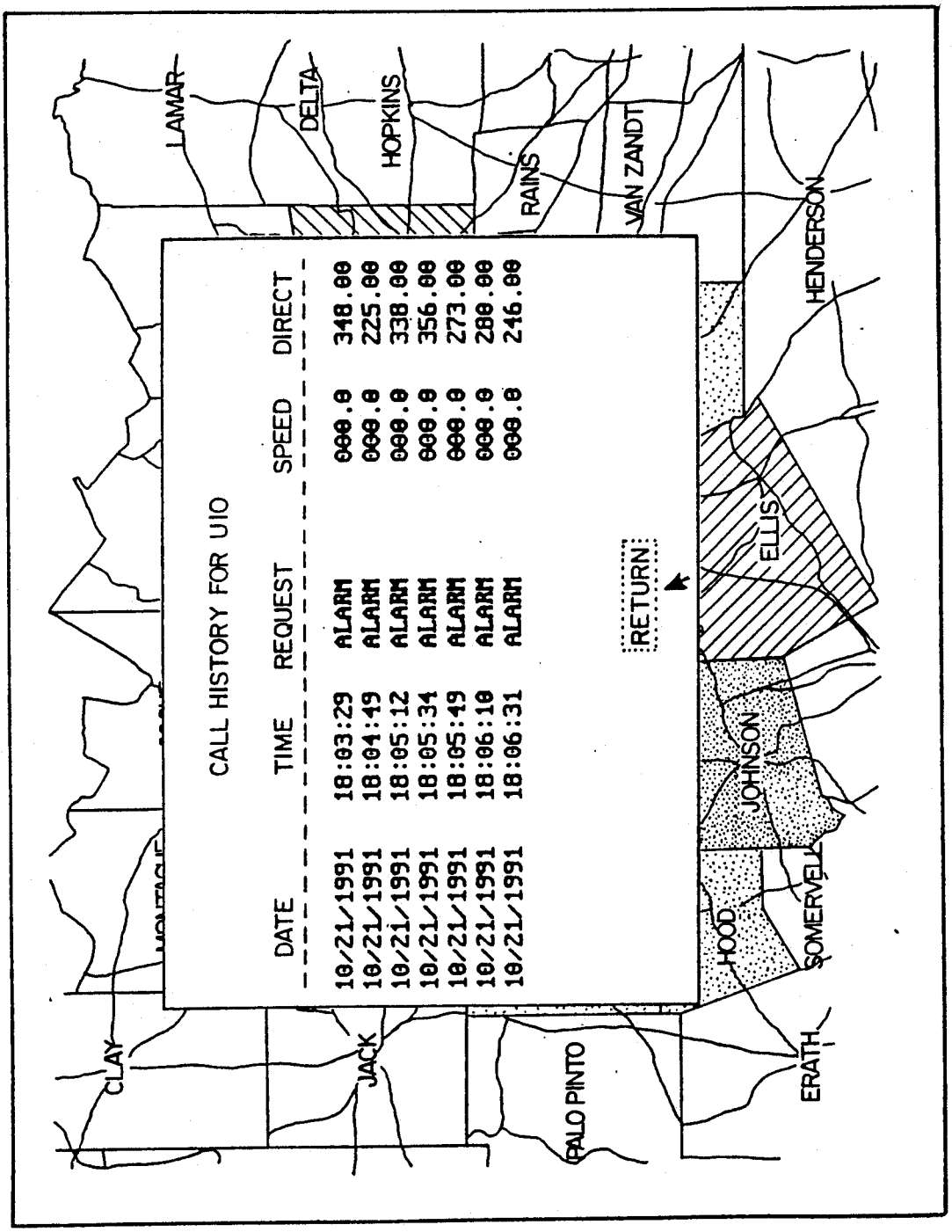
FIG. 16 illustrates an exemplary vehicle CALL HISTORY superimposed on a map, as displayed to the Control Center operator after being accessed via FIG. 15.

Returning to discussion of the main menu on the General Area Coverage Map display of FIG. 13, the SELECT menu selection allows details of a particular vehicle to be displayed. In particular, when the operator chooses the SELECT menu entry, a "CALL STATUS" window appears on the screen. The "CALL STATUS" window includes a list of active vehicles, as shown in FIG. 15. A typical CALL STATUS menu shows for each vehicle number V10, V11 a mobile ID number (such as a telephone number) and a Call Type (showing an alarm or other condition). The time elapsed since the call was first made active is also displayed. Further, the number in the "SCREEN NUMBER" tells which of the mapping displays 182B, 182C, 182D, on which the particular vehicle is displayed. The entry in the "STATUS" field may be either "ACTIVE" or "CANCEL". A "CANCEL" entry indicates that the vehicle operator has sent a CANCEL command, indicating that the assistance has been received. The Control Center operator may select the ABORT option to return to the "Ready for Call" mode. Alternatively, the operator may select one of the vehicle numbers in the INDEX column, to display further detailed information regarding that particular vehicle. In the event that vehicle V10 is selected, another menu, a SCREEN SELECT menu (not specifically shown) is displayed in a window. The operator may use the SCREEN SELECT menu to display the selected vehicle's location on a given screen (such as 182B, 182C, 182D), or to REVIEW a given vehicle's CALL HISTORY. If the operator chooses a screen, the vehicle will be shown at the center of the screen as a directional arrow, on a one-mile-square map or a previously selected viewing area. If the REVIEW option is selected from the SCREEN SELECT menu, the CALL HISTORY for the selected vehicle is displayed in a window, as illustrated in FIG. 16. The CALL HISTORY includes the date and time each call was received, along with the type of request which was sent in the call. The illustrated CALL HISTORY shows a sequence of Alarms, although requests for fire assistance, police, ambulance, or wrecker may be listed in the Request column. The speed and direction of the vehicle at the time of the call, as transmitted from GPS-derived data, is also listed in the CALL HISTORY in FIG. 16.

Upon receipt of a new call, a dot will flash on the General Area Coverage Map (FIG. 11). Preferably, a beeping tone alerts the operator that a new call is being received. The dot will stop flashing, and will be labelled with a vehicle reference number V1, V2... for identification purposes in the CALL STATUS menu (FIG. 15). Reference numbers are assigned to incoming calls in a sequential order, with calls from the same Mobile Unit having the same vehicle reference number.

Figure 17:
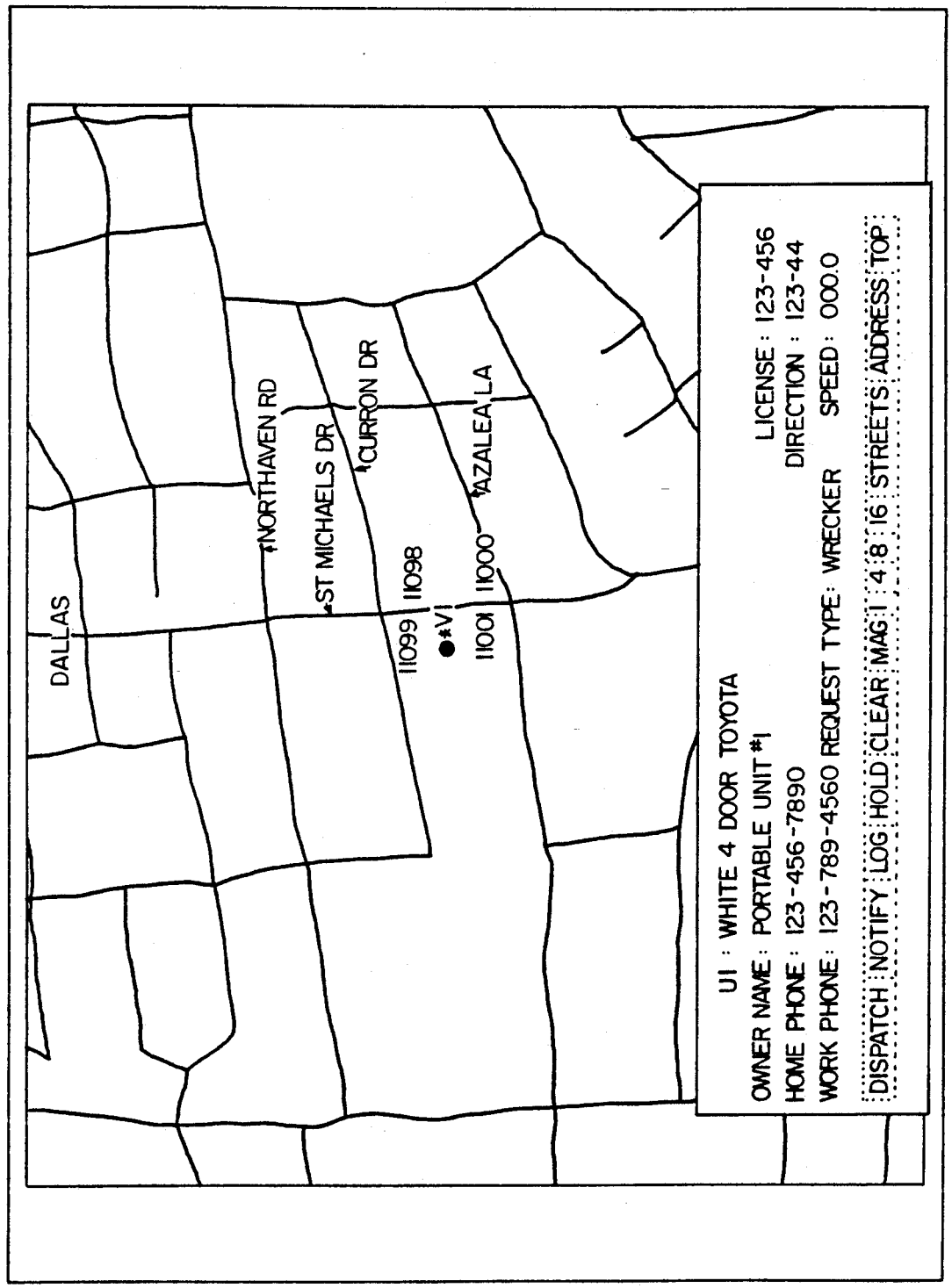
FIG. 17 illustrates an exemplary CALL CONTROL menu, superimposed on a map, as displayed to the Control Center operator after being accessed via FIG. 15

At the same time the new call is displayed on the General Area Coverage Map in FIG. 11 on mapping display 182A, a second map will appear on mapping display 182B, as it is presumably not yet in use. The vehicle causing the new incoming call is represented by a same-color dot and vehicle reference number as on the General Area Coverage Map of mapping display 182A. FIG. 17 illustrates the displayed location of the vehicle causing the present call. FIG. 17 also illustrates a new menu allowing the operator to handle a call. The menu shown in FIG. 17 exemplifies a motorist's request for wrecker service. When the request for a wrecker service is received, the system accesses its record database file and displays a wrecker service close to the requesting vehicle. By selecting 1, 4, 8, or 16 on the CALL CONTROL menu of FIG. 17, the operator may display a map which encompasses both the calling vehicle and the nearest wrecker service. By selecting the DISPATCH option on the menu of FIG. 17, cross hairs appear on the map. The operator may choose the wrecker service which is to be dispatched by pressing a mouse button or other suitable data entry means. By selecting a particular wrecker service, a new menu appears on the screen, including telephone and address information about the wrecker service which allows the operator to communicate with it. Preferably, the menu includes a blank line into which the operator may enter notes about the action he is taking in response to the call. These notes become part of the vehicle's CALL HISTORY which may be displayed on the screen or printed on a shift report or other report. After calling the wrecker company and noting this response, the operator may return to the CALL CONTROL menu of FIG. 17.

By choosing the NOTIFY option in the FIG. 17 menu, the telephone number or other contact numbers of the owner are displayed in a window. Also, preferably, a line is provided for entering notes detailing calls or attempted calls to the vehicle's owner, again for log keeping purposes.

If the operator chooses the LOG menu entry from FIG. 17, the operator may enter miscellaneous log entries. These log entries are entered into the vehicle's call record in the same manner as the other notes described above. Generally, information about calls, whether derived directly from the incoming call data or from manual Control Center operator input, may be stored indefinitely and used for productivity reports, work-orders, billing, statistical studies, and so forth.

By selecting the HOLD option in the FIG. 17 menu, the present call remains displayed on mapping display 182B, but the operator may return to the Ready for Call Mode on mapping display 182A.

By choosing the CLEAR option on the FIG. 17 menu, the vehicle call is "cleared" from the system after the operator's response is completed. By "clearing" a vehicle call from the display controller, the call is removed from all lists and all map displays.

The MAG selection on the FIG. 17 menu allows the user to magnify a portion of a displayed map. By selecting the MAG option, cross hairs appear on the screen. The operator may then choose an upper left point, and a lower right point, which define the area which is to be magnified. The display controller 180 manages this zooming process. As mentioned briefly above, a Control Center operator may select the 1, 4, 8, or 16 mile scale entries, which cause the map to be redrawn at that scale.

The operator may choose to label street names on the map by choosing the STREET option, which causes cross hairs to appear on the screen. The operator selects the street using a mouse or other suitable input device, after which the display controller will display the street name on the map.

When the operator selects the ADDRESS option on the FIG. 17 menu, the operator causes the display controller to put a street block number on any street segment which he selects. Selection of the street segment is made in the same manner as that described above, with respect to the STREET option. In particular, the lowest street number, and the highest street number on a particular block on a particular street can be displayed.

Based on the foregoing description of exemplary screen displays and operator interaction, it is apparent to those skilled in the art that the present invention provides a comprehensive monitoring and dispatch capability. A large number of vehicles may send a variety of different alarm signals or requests for assistance at irregular intervals, allowing a Control Center operator to respond appropriately and immediately.

The display controller, as well as the communications controller, are implemented using commercially available computers. Software allowing the communications controller 190 and the display controller 180 to interact and perform their basic functions is readily available to those skilled in the art, and need not be further described here. Further, the geo-coded data relating to area maps may be purchased and installed in a manner readily appreciated by those skilled in the art. Information regarding the address, phone numbers, and other relevant information about police stations, fire stations, fire hydrants, ambulance services, wrecker services, may be purchased or entered for appropriate retrieval in a database in the display controller. Furthermore, the ability of known display controllers software to take information in such databases, and display it on two-dimensional graphic images on screens such as mapping displays 182A-182D, lies readily within the ability of those skilled in the art. The present invention is not directed to the low-level functions thus described, but rather in the application of those functions in an integrated monitoring, communication and dispatch system. The communications controller 190 and the display controller 180 are provided with conventional I/O and peripheral devices for data entry and display. For example, conventional keyboards may be employed to enter log information, and mouse or trackball devices may be used to select particular points on displayed maps.

Other information related to the vehicle's operator, such as the name, telephone, sex, age, blood type, allergic reactions to medication, and so forth, may be included in the databases. Further, the database may include information as to the vehicle itself, such as the vehicle type (boat, truck, automobile), its color, license number, make and model. Thus, whatever information might prove useful to the Control Center operator in dispatching requested help, could be included in the database.

Modifications and variations of the above-described embodiments of the present invention are possible, as appreciated by those skilled in the art in light of the above teachings. For example, the present invention is described in terms of a GPS-based positioning system used with an automobile communicating with a Control Center via a cellular telephone link, but it is understood that these are merely preferred implementations of broader functions envisioned by the present invention.

It is therefore to be understood that, within the scope of the appended claims and their equivalents, the invention may be practiced otherwise than as specifically described.

What is claimed is:

1. A mobile unit for a vehicle monitoring system, the mobile unit comprising:
   a) an input unit, responsive to an event or condition associated with the vehicle, and providing information describing the event or condition;
   b) a satellite receiver, responsive to navigation signals transmitted by a satellite navigation system, and providing information inherently describing the vehicle's location based on the navigation signals; and
   c) a mobile unit controller, responsive to the input unit and the satellite receiver, the mobile unit controller including a cellular telephone transmitter for transmitting information onto a cellular telephone communications link, the information transmitted on the cellular telephone communications link including both (1) the information describing the event or condition and (2) the information inherently describing the vehicle's location, the mobile unit controller automatically inserting the information describing the vehicle's location into the information transmitted onto the cellular telephone communications link.

2. The mobile unit of claim 1, wherein the input unit includes:
   an operator input device which, when activated by a vehicle operator, causes the mobile unit controller to transmit a message onto the communications link while automatically inserting the information describing the vehicle's location into the transmitted information with the message.

3. The mobile unit of claim 2, wherein:
   the operator input device includes a keypad including keys whose closure is detected by the mobile unit controller; and
   the mobile unit controller transmits a message corresponding to the particular key or keys the operator has closed.

4. The mobile unit of claim 3, wherein:
   the mobile unit controller transmits a message constituting a request for assistance corresponding to a sequence of key closures.

5. The mobile unit of claim 1, wherein the input unit includes;
   an alarm system including at least one sensor that automatically detects the event or condition associated with the vehicle and causes the mobile unit controller to transmit an alarm message onto the communications link while automatically inserting the information describing the vehicle's location into the transmitted information with the alarm message.

6. A mobile unit for a vehicle monitoring system, the mobile unit comprising:
   a) a vehicle alarm system, responsive to an alarm event or alarm condition associated with the vehicle, and providing information describing the alarm event or alarm condition;
   b) a satellite receiver, responsive to navigation signals transmitted by a satellite navigation system, and providing information inherently describing the vehicle's location based on the navigation signals; and
   c) a mobile unit controller, responsive to the vehicle alarm system and the satellite receiver, the mobile unit controller transmitting information onto a communications link, the information transmitted on the communications link including both (1) the information describing the alarm event or alarm condition and (2) the information inherently describing the vehicle's location, the mobile unit controller automatically inserting the information inherently describing the vehicle's location into the information transmitted onto the communications link.

7. A mobile unit for a vehicle monitoring system, the mobile unit comprising:
   a) an input unit, responsive to an event or condition associated with the vehicle, and providing information describing the vent or condition;
   b) a location unit providing information inherently describing the vehicle's location;
   c) a cellular telephone transmitter including means for forming a decision as to whether or not the transmitter is in range of a cellular telephone network, and transmitting information onto a cellular telephone communications link only when the transmitter is in range of a cellular telephone network; and
   d) a mobile unit controller, responsive to the input unit and ht location unit, the mobile unit controller including:
      1) a storage device, the storage device including a storage area for storing both (1) the information describing the event or condition and (2) the information inherently describing the vehicle's location in association with each other; and
      2) a processor, interacting with the cellular telephone transmitter and controlling the storage device in response to the decision as to whether or not the transmitter is in range of a cellular telephone network, the processor performing the functions of:
         i) storing in the storage device (1) the information describing the event or condition and (2) the information inherently describing the vehicle's location in association with each other, when the transmitter is not in range of a cellular telephone network; and
         ii) retrieving from the storage device (1) the information describing the event or condition and (2) the information inherently describing the vehicle's location in association with each other, when the transmitter is in range of a cellular telephone network.

8. A mobile unit for a vehicle monitoring system, the mobile unit comprising:
   1) an operator input device having a number of inputs characterizing only approximately four distinct predetermined messages, the operator input device providing information describing a chosen message when one or more inputs relating to the chosen message are activated by an operator;
   2) a satellite receiver, responsive to navigation signals transmitted by a satellite navigation system, and providing information inherently describing the vehicle's location based on the navigation signals; and
   3) a mobile unit controller, responsive to the operator input device and the satellite receiver, the mobile unit controller transmitting information onto a communications link, the information transmitted on the communications link including both (1) the information describing the chosen message and (2) the information inherently describing the vehicle's location, the mobile unit controller automatically inserting the information describing the vehicle's location into the information transmitted onto the communications link.

9. A control center for a vehicle monitoring system having a plurality of mobile units mounted in respective vehicles and a communications link between the mobile units and the control center, the control center comprising:
 a) a control center display portion including:
  1) one or more display screens displaying one or more maps with symbols of vehicles sending messages to the control center; and
  2) real-time display software allowing the symbols of the vehicles sending messages to be displayed substantially in real-time;
 b) at least about eight communications interface devices coupled to the communications link, receiving sporadically-timed messages from the mobile units, and outputting the messages; and
 c) a control center buffer portion coupled to the control center display portion, the buffer portion responsive to the messages output by the communications interface devices and the buffer portion including:
  1) means for examining the messages received for determining if the messages pass or fail the examination;
  2) means for generating individual responses to the messages received from respective vehicle mobile units based on the examination of the messages, the means for generating individual responses being coupled to forward the individual responses to the communications link and to the control center display portion; and
  3) means for providing to the control center display portion certain messages that have passed the examination, the messages allowing the real-time display software to display the symbols of the vehicles sending the messages that have passed the examination.

10. A vehicle monitoring system comprising:
 a) an ambulatory operator input device means for an operator to carry away from a vehicle, the ambulatory operator input device means providing information describing a message when activated by the operator; and
 b) a mobile unit means for attachment to a vehicle, the mobile unit means including:
  1) a local receiver including means to communicate with the ambulatory operator input device means, the local receiver receiving the message when activated by the operator;
  2) a location unit providing information inherently describing the vehicle's location; and
  3) a mobile unit controller, responsive to the local receiver and the location unit, the mobile unit controller transmitting information onto a communications link, the information transmitted on the communications link including both (1) the message and (2) the information inherently describing the vehicle's location, the mobile unit controller automatically inserting the information inherently describing the vehicle's location into the information transmitted onto the communications link.

11. A control center for a vehicle monitoring system having a plurality of mobile units mounted in respective vehicles and a communications link between the mobile units and the control center, the control center comprising:
 a) a control center display portion, including display screens displaying one or more maps with symbols of vehicles sending messages to the control center;
 b) a satellite reference receiver, responsive to navigation signals transmitted by a satellite navigation system, and providing information inherently describing the control center's location based on the navigation signals; and
 c) a control center communications controller, the control center communications controller being responsive to messages received from the mobile units, the communications controller being coupled to the control center display portion and to the satellite receiver, the communications controller including:
  1) means for extracting, from the messages received from the mobile units, vehicle position information that is derived from vehicle position information provided by a mobile unit satellite receiver receiving navigation signals transmitted by the satellite navigation system;
  2) means for adjusting the vehicle position information in accordance with a drift error correction term derived from the navigation signals, to provide adjusted vehicle position information; and
  3) means for providing to the control center display portion the adjusted vehicle position information so that the control center display portion displays the symbols of the vehicles on the one or more maps in accordance with the drift error correction term.

* * * * *

REEXAMINATION CERTIFICATE (3982nd)

United States Patent [19]
Mansell et al.

[11] B1 5,223,844
[45] Certificate Issued Jan. 25, 2000

[54] VEHICLE TRACKING AND SECURITY SYSTEM

[75] Inventors: John P. Mansell; William M. Riley, both of Dallas, Tex.

[73] Assignee: Auto-Trac, Inc., Dallas, Tex.

Reexamination Request:
No. 90/004,974, Apr. 22, 1998

Reexamination Certificate for:
Patent No.: 5,223,844
Issued: Jun. 29, 1993
Appl. No.: 07/870,141
Filed: Apr. 17, 1992

[51] Int. Cl.[7] ............................. H04B 7/185; G01S 5/02
[52] U.S. Cl. ............................. 342/357.07; 342/357.09; 342/457; 701/213; 340/825.49; 379/913; 455/404; 455/456
[58] Field of Search ..................................... 342/357, 457, 342/357.07, 357.09; 701/213, 214; 340/825.49; 379/913; 455/404, 456

[56] References Cited

U.S. PATENT DOCUMENTS 3,876,890  4/1975  Brown et al. .
4,701,760  10/1987 Raoux .
4,833,477  5/1989  Tendler .
5,119,102  6/1992  Barnard .
5,131,020  7/1992  Liebesny et al. .
5,193,215  3/1993  Olmer .

FOREIGN PATENT DOCUMENTS 0 242 099 A2  10/1987  European Pat. Off. .

*Primary Examiner*—Theodore M. Blum

[57] ABSTRACT

The present invention provides a vehicle tracking and security system which allows immediate response in case of vehicle theft, an accident, vehicle breakdown, or other emergency. Guardian and tracking functions are provided through Mobile Units installed in hidden locations in vehicles to be monitored. The Mobile Units communicate with a Control Center. Preferably, the Mobile Unit provides vehicle theft and intrusion protection using an in-vehicle alarm and security system linked to the Control Center by a transceiver in the Mobile Unit. Also, a keypad or other human interface device is provided, allowing a vehicle driver or occupant to signal the Control Center that a particular type of assistance is needed. The vehicle's location may be automatically transmitted to the Control Center along with any automatic alarm signal or manually entered request, the location being precisely determinable anywhere in the world through use of Global Positioning System (GPS) information. The present invention provides continuous monitoring of a large number of vehicles for a broad range of status and emergency conditions over a virtually unlimited geographic area, also allowing manual communication of requests for assistance to that specific location. Advantageously, the system is implemented using existing commercial or police communications equipment.

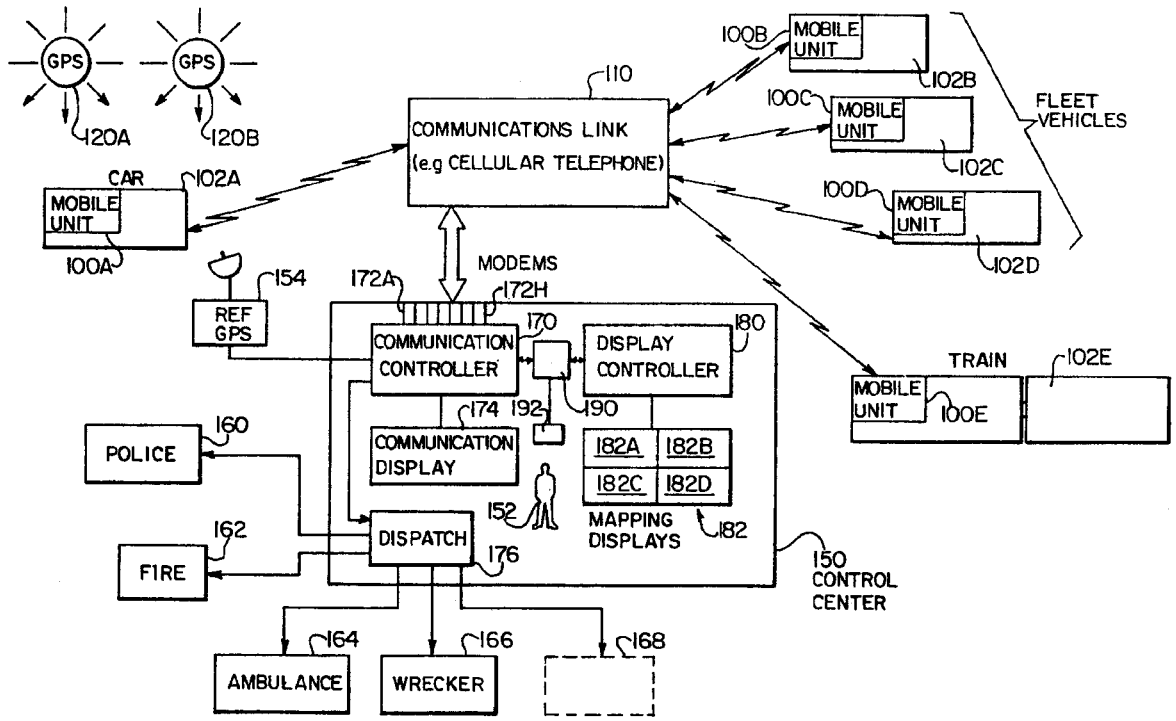

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 11 is confirmed.

Claims 1–3, 6, 8–10 are cancelled.

Claims 4, 5, 7 are determined to be patentable as amended.

New claims 12–22 are added and determined to be patentable.

4. The mobile unit of claim [3] *12*, wherein:
the mobile unit controller transmits a message constituting a request for assistance corresponding to a sequence of key closures.

5. The mobile unit of claim [1] *12*, wherein the [input unit] *vehicle condition sensor* includes:
an alarm system including at least one sensor that automatically detects [the] *an* event or condition associated with the vehicle and causes the mobile unit controller to transmit an alarm message onto the communications link while automatically inserting the information describing the vehicle's location into the transmitted information with the alarm message.

7. A mobile unit for a vehicle monitoring system, the mobile unit comprising:
   [a)] an input unit, responsive to an event or condition associated with the vehicle, and providing information describing the [vent] *event* or condition;
   [b) a location unit providing information inherently describing the vehicle's location;] *a location unit including a satellite receiver responsive to satellite position information including latitude, longitude and time, the satellite receiver generating information inherently describing vehicle location correlated to the received time;*
   [c)] a cellular telephone transmitter [including means] for [forming a decision as to whether or not the transmitter is in range of a cellular telephone network, and] transmitting information onto a cellular telephone communications link only when the transmitter is in range of a cellular telephone network; [and] *means for determining whether or not the cellular telephone transmitter is in range of a cellular telephone network*;
   [d)] a mobile unit controller, responsive to the input unit and [ht] *the* location unit, the mobile unit controller including:
   1) a storage device[, the storage device] including a storage area for storing both (1) the formation describing the event or condition and (2) the information inherently describing the vehicle's location [in association with each other] *at the time correlated with the vehicle position*; and
   2) a processor, interacting with the cellular telephone transmitter and controlling the storage device in response to the [decision] *determination* as to whether or not the transmitter is in range of a cellular telephone network, the processor performing the functions of:
      i) storing in the storage device (1) the information describing the event or condition and (2) the information inherently describing the vehicle's location [in association with each other,] when the transmitter is not in range of a cellular telephone network; and
      ii) retrieving from the storage device (1) the information describing the event or condition and (2) the information inherently describing the vehicle's location [in association with each other,] when the transmitter is in range of a cellular telephone network[.]; *and the mobile unit controller responsive to said processor retrieving from the storage device the information describing the event or condition and the information inherently describing the vehicle's location for transmitting the information from the cellular telephone transmitter to a control center.*

12. *A mobile unit for a vehicle monitoring system, comprising:*
    *a vehicle condition sensor for generating signals varying with the operation of the vehicle;*
    *an operator activated sensor for generating signals identifying an operator input message;*
    *a satellite receiver responsive to satellite position information including latitude, longitude and time, the satellite receiver generating vehicle position signals correlated to a received time;*
    *a cellular telephone transmitter for transmitting information onto a cellular telephone communications link; and*
    *a mobile unit controller responsive to signals varying with the operation of vehicle, signals identifying an operator input message and the vehicle position signals, the mobile unit controller transmitting signals from the cellular telephone transmitter in accordance with a priority designation between the signals varying the operation of the vehicle and signals varying with operator inputs along and simultaneous therewith the vehicle position signals.*

13. *A mobile unit for a vehicle monitoring system as set forth in claim 12 further comprising:*
    *a backup vehicle position detector responsive to vehicle position information and generating backup vehicle position signals; and*
    *said mobile unit controller further responsive to the backup vehicle position signals for transmission from the cellular telephone transmitter along with the priority designation signal.*

14. *A mobile unit for a vehicle monitoring system as set forth in claim 12 further comprising:*
    *a power source for the mobile unit controller; and*
    *a power source detector responsive to a loss of power to the mobile unit controller and generating a power failure signal for transmission from the cellular telephone transmitter to a control center.*

15. *A mobile unit for a vehicle monitoring system as set forth in claim 12 wherein said mobile unit controller includes storage memory for storing the priority designated signal from said vehicle condition sensor or said operator* activated sensor along with information describing vehicle position at the time of occurrence of the priority designated signal, the information stored upon failure of the cellular telephone transmitter to transmit information onto the cellular telephone communications link for later transmission.

16. A mobile unit for a vehicle monitoring system as set forth in claim 15 further comprising:

a processor for retrieving the stored information describing the priority designated signal and the information describing vehicle position for transmission from the cellular telephone transmitter when operational for transmission of signals.

17. A mobile unit for a vehicle monitoring system as set forth in claim 12 wherein the operator activated sensor comprises a plurality of designated push buttons to enable an operator to activate selective ones of the push buttons to compose a desired operator input message.

18. A mobile unit for a vehicle monitoring system as set forth in claim 12 wherein said operator activated sensor comprises a plurality of designated push buttons to enable an operator to actuate selected ones of the push buttons to provide information describing a chosen message when one or more push buttons relating to the chosen message are activated by an operator.

19. A mobile unit for a vehicle monitor system, comprising:

a vehicle condition sensor for generating signals varying with operation of the vehicle;

an operator activated sensor for generating signals identifying an operator input message, said operator activated sensor comprising a plurality of designated push buttons to enable an operator to actuate selected ones of the push buttons to compose a desired operator input message;

a satellite receiver responsive to satellite position information including latitude, longitude and time, the satellite receiver generating vehicle position signals correlated to a received time;

cellular telephone transmitter for transmitting information onto a cellular telephone communications link;

a mobile unit controler responsive to signals varying with the operation of the vehicle, signals identifying an operator input message and the vehicle position signals, the mobile unit controller transmitting signals from the cellular telephone transmitter from said vehicle condition sensor or said operator activated sensor in accordance with a priority designation between signals varying with operation of the vehicle or signals varying with operator inputs along and simultaneously with the vehicle position signals; and a monitor coupled to the mobile unit controller and responsive to an operational signal therefrom to monitor the operation of the mobile unit controller and to generate a command upon detection of a failure of the mobile unit controller.

20. A mobile unit for a vehicle monitoring system as set forth in claim 18 further comprising:

storage memory for storing information relating to the operation of the vehicle or relating to signals identifying an operator input message along with information describing vehicle position and the time of occurrence of the signals varying with operation of the vehicle or signals identifying an operator input message, the information stored upon failure of the cellular telephone transmitter to transmit information onto the cellular telephone communications link; and a processor for retrieving the stored information describing and varying with the operation of the vehicle or signals identifying an operator input message and information describing vehicle position at the time of storing the signals varying with the operation of the vehicle or signals identifying an operator input message said processor coupled to the mobile unit controller to activate the controller to transmit from the cellular telephone transmitter when operational in a transmission mode.

21. A vehicle monitoring system for a plurality of mobile units each mounted in one of a plurality of vehicles, the vehicle monitoring system comprising:

a mobile unit for each of the plurality of vehicles, said mobile unit comprising:

a) an input unit, responsive to an event or condition associated with the vehicle, and providing information describing the event or condition:

b) a satellite receiver, responsive to navigation signals transmitted by a satellite navigation system, and providing information inherently describing the vehicle's location based on the navigation signals; and c) a mobile unit controller, responsive to the input unit and the satellite receiver, the mobile unit controller including a cellular telephone transmitter for transmitting information onto a cellular telephone communications link, the information transmitted on the cellular telephone communications link including both (1) the information describing the event or condition and (2) the information inherently describing the vehicle's location, the mobile unit controller automatically inserting the information describing the vehicle's location into the information transmitted onto the cellular telephone communications link;

a control center for establishing two-way communication with the mobile unit to verify the identity of a mobile unit transmitting information on said cellular telephone transmitter; and the control center further comprising a reference position receiver for selectable real time correction of vehicle position information transmitted from a mobile unit.

22. A vehicle monitoring system as set forh in claim 21 wherein said control center further comprises means for maintaining a time history of position drift at the control center for correlation to the time a received message was stored in the mobile unit.

\* \* \* \* \*